(12) United States Patent
Morita et al.

(10) Patent No.: US 9,880,276 B2
(45) Date of Patent: Jan. 30, 2018

(54) RADAR DEVICE

(71) Applicant: Panasonic Corporation, Osaka (JP)

(72) Inventors: Tadashi Morita, Kanagawa (JP); Takaaki Kishigami, Tokyo (JP); Yoichi Nakagawa, Tokyo (JP)

(73) Assignee: PANASONIC CORPORATION, Osaka (JP)

( * ) Notice: Subject to any disclaimer, the term of this patent is extended or adjusted under 35 U.S.C. 154(b) by 498 days.

(21) Appl. No.: 14/603,053

(22) Filed: Jan. 22, 2015

(65) Prior Publication Data
US 2015/0212197 A1 Jul. 30, 2015

(30) Foreign Application Priority Data
Jan. 30, 2014 (JP) .................................. 2014-015950

(51) Int. Cl.
| | | |
|---|---|---|
| G01S 7/40 | (2006.01) | |
| G01S 13/10 | (2006.01) | |
| G01S 7/292 | (2006.01) | |
| G01S 7/285 | (2006.01) | |
| G01S 7/34 | (2006.01) | |

(52) U.S. Cl.
CPC .............. *G01S 13/10* (2013.01); *G01S 7/285* (2013.01); *G01S 7/292* (2013.01); *G01S 7/40* (2013.01); *G01S 7/34* (2013.01); *G01S 7/4021* (2013.01)

(58) Field of Classification Search
CPC . G01S 7/285; G01S 7/292; G01S 7/34; G01S 7/40; G01S 7/4021
See application file for complete search history.

(56) References Cited

U.S. PATENT DOCUMENTS 3,781,882 A * 12/1973 Holberg ................ G01S 13/524
  342/162
4,680,588 A *  7/1987 Cantwell ............... G01S 7/2928
  342/26 R
4,710,772 A * 12/1987 Cantwell ............... G01S 7/2928
  342/194

(Continued)

FOREIGN PATENT DOCUMENTS

| JP | 02-060232 A | 2/1990 |
|---|---|---|
| JP | 2005-077137 | 3/2005 |

(Continued)

OTHER PUBLICATIONS

John Vanderkooy et al., "Resolution Below the Least Significant Bit in Digital Systems with Dither" J.Audio Eng.Soc., vol. 32,No. 3,1984,pp. 106-113.

*Primary Examiner* — Peter M Bythrow
(74) *Attorney, Agent, or Firm* — Seed IP Law Group LLP

(57) ABSTRACT

A radar device is provided with: a transmitter that transmits a high-frequency radar transmission signal from a transmission antenna; a controller that controls execution or stopping of transmission of the radar transmission signal; a receiver that amplifies a thermal noise signal inputted from reception antenna by using an initial gain value and quantize the amplified thermal noise signal, while the transmission of the radar transmission signal is stopped; and a gain controller that adjusts the prescribed gain value to a gain value suitable for dithering of the thermal noise signal, based on the quantized thermal noise signal.

10 Claims, 21 Drawing Sheets

(56) References Cited

U.S. PATENT DOCUMENTS

| | | | | |
|---|---|---|---|---|
| 6,864,827 | B1* | 3/2005 | Tise | G01S 13/90 |
| | | | | 342/194 |
| 6,870,162 | B1* | 3/2005 | Vaidya | H04N 5/217 |
| | | | | 250/330 |
| 6,900,438 | B2* | 5/2005 | Vaidya | G01J 5/52 |
| | | | | 250/336.1 |
| 9,239,378 | B2 | 1/2016 | Kishigami et al. | |
| 9,654,133 | B2* | 5/2017 | Speir | H03M 1/128 |
| 2003/0030582 | A1* | 2/2003 | Vickers | G01S 17/023 |
| | | | | 342/54 |
| 2005/0270226 | A1* | 12/2005 | Hager | G01S 7/34 |
| | | | | 342/120 |
| 2006/0122814 | A1* | 6/2006 | Beens | G06F 15/7864 |
| | | | | 702/189 |
| 2007/0192391 | A1* | 8/2007 | McEwan | G01S 7/285 |
| | | | | 708/271 |
| 2007/0210955 | A1* | 9/2007 | McEwan | G01S 7/285 |
| | | | | 342/175 |
| 2009/0021419 | A1* | 1/2009 | Winstead | H04B 1/10 |
| | | | | 342/92 |
| 2010/0188158 | A1* | 7/2010 | Ainspan | H03L 7/081 |
| | | | | 331/1 A |
| 2011/0102244 | A1* | 5/2011 | Jales | G01S 7/062 |
| | | | | 342/135 |
| 2013/0176166 | A1 | 7/2013 | Kishigami et al. | |
| 2013/0201050 | A1* | 8/2013 | Hellsten | G01S 7/006 |
| | | | | 342/21 |
| 2014/0270002 | A1* | 9/2014 | Schubert | H04L 1/0045 |
| | | | | 375/320 |
| 2015/0160066 | A1* | 6/2015 | Sai | G01F 23/284 |
| | | | | 342/21 |
| 2016/0182075 | A1* | 6/2016 | Devarajan | H03M 1/1019 |
| | | | | 341/120 |
| 2016/0373120 | A1* | 12/2016 | Caffee | H03L 7/091 |

FOREIGN PATENT DOCUMENTS

| | | |
|---|---|---|
| JP | 2006-093870 A | 4/2006 |
| JP | 2012-083143 A | 4/2012 |

* cited by examiner

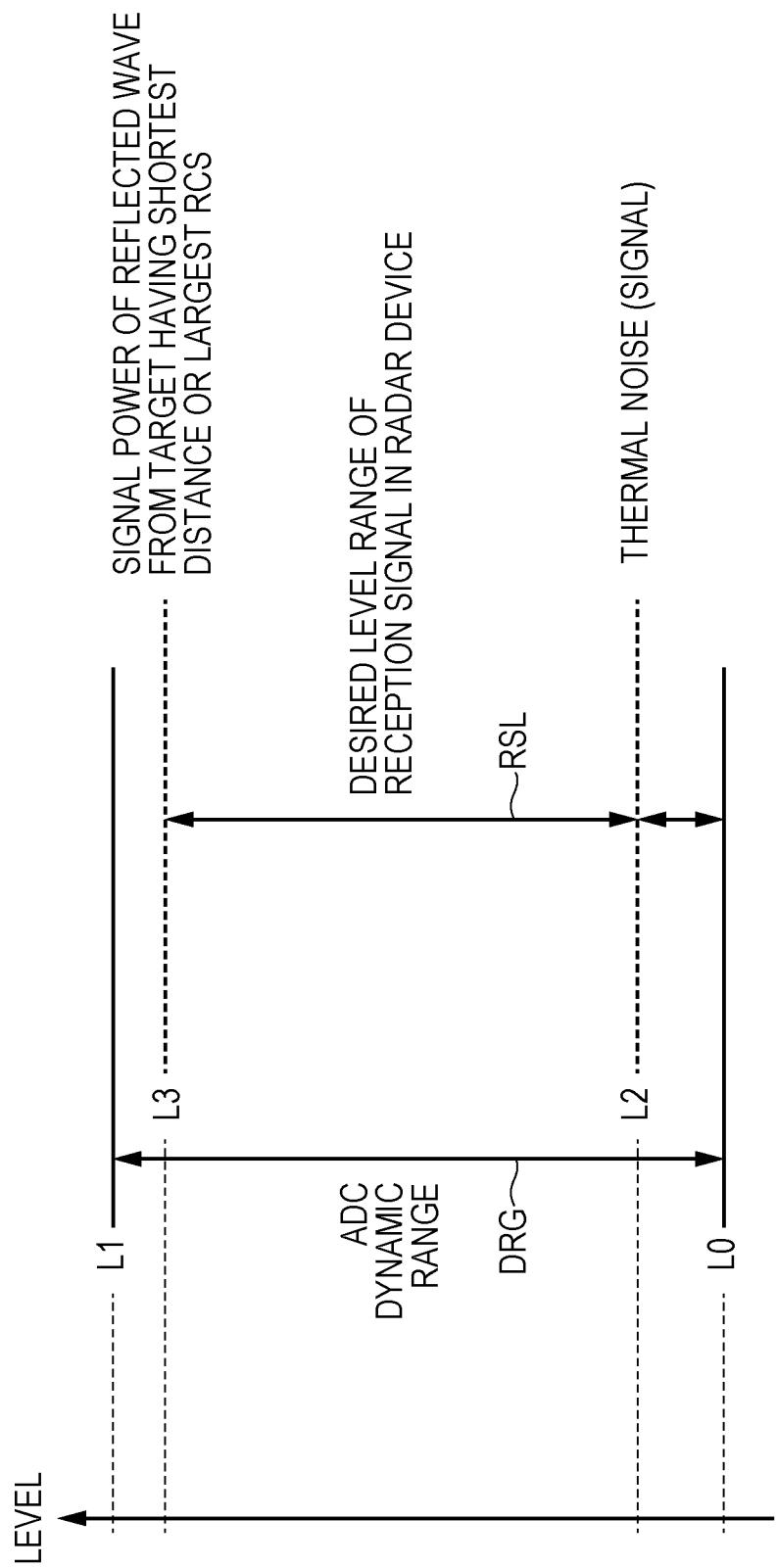

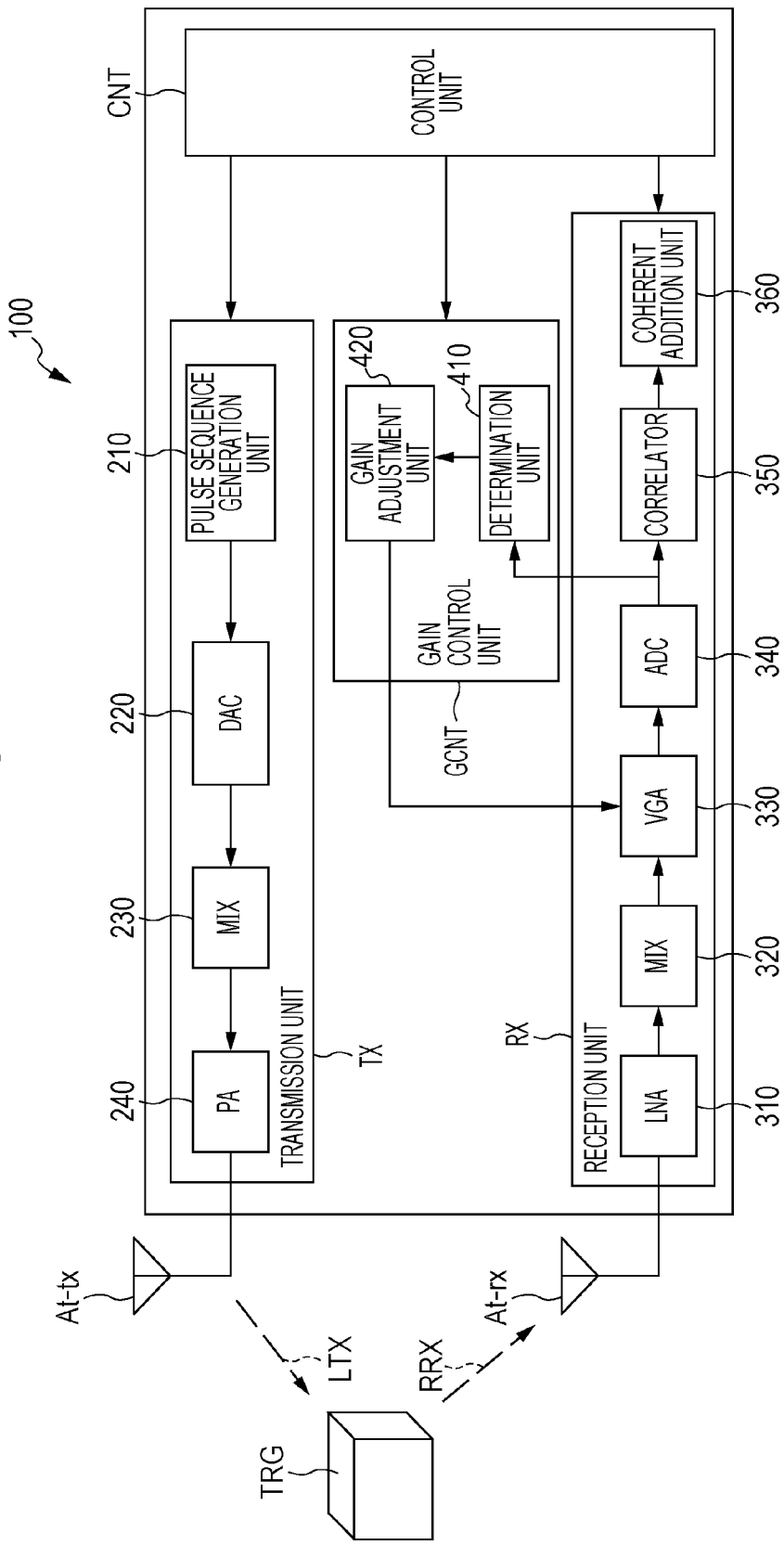

| N-BIT QUANTIZATION DATA | FIRST (N − 1)-BIT CONVERTED QUANTIZATION DATA | SECOND (N − 1)-BIT CONVERTED QUANTIZATION DATA |
|---|---|---|
| 0 | 0 (SAME VALUE) | 1 (SAME VALUE) |
| 1 | 0 (EVEN NUMBER VALUE THAT IS 1 LESS) | −1 (ODD NUMBER VALUE THAT IS 1 LESS) |
| 2 | 2 | 1 |
| 3 | 2 | 3 |
| 4 | 4 | 3 |
| 5 | 4 | 5 |
| 6 | 6 | 5 |
| 7 | 6 | 7 |
| ... | ... | ... |
| 255 | 254 | 255 |

Xn: AMPLITUDE OF 1 LSB IN N-BIT ADC
Zn: AMPLITUDE SUITABLE FOR DITHERING IN N-BIT ADC

Xn − 1: AMPLITUDE OF 1 LSB IN (N − 1)-BIT ADC
Zn − 1: AMPLITUDE SUITABLE FOR DITHERING IN (N − 1)-BIT ADC

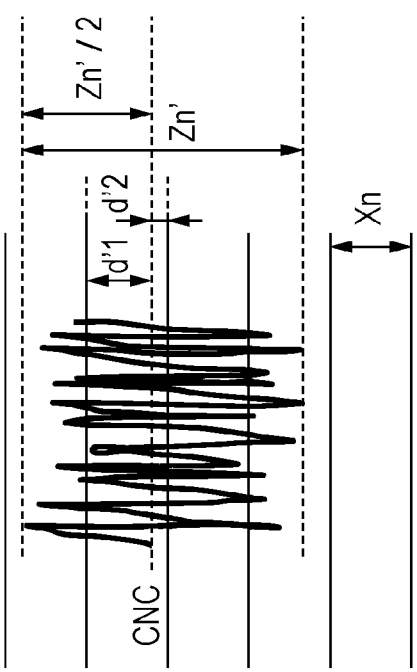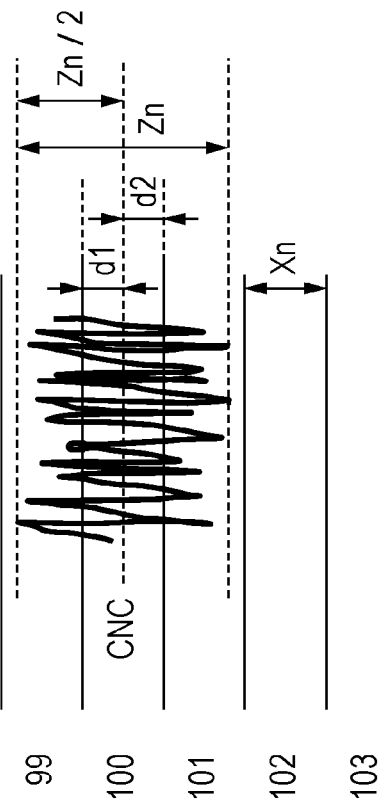

FIG. 6

FIRST (N − 1)-BIT CONVERSION UNIT OUTPUT

| N-BITS | PRE-CONVERSION INPUT | |
|---|---|---|
| 98 | 9 8 | |
| 99 | 1 0 0 | CNC |
| 100 | 1 0 0 | |
| 101 | 1 0 2 | |
| 102 | 1 0 4 | |
| 103 | | |

PROCESSING BY
FIRST COHERENT ADDITION UNIT AND
FIRST NORMALIZATION UNIT (100 + 100 + 100 + 100 + 100
+ 100 + 100 + 100 + 100 + 100) / 10
= 1000 / 10
= 100

SECOND (N − 1)-BIT CONVERSION UNIT OUTPUT

| N-BITS | PRE-CONVERSION INPUT | |
|---|---|---|
| 98 | 9 9 | |
| 99 | 1 0 1 | CNC |
| 100 | 1 0 1 | |
| 101 | 1 0 3 | |
| 102 | | |
| 103 | | |

PROCESSING BY
SECOND COHERENT ADDITION UNIT AND
SECOND NORMALIZATION UNIT (99 + 99 + 99 + 99 + 99
+ 99 + 99 + 99 + 99 + 99) / 10
= 990 / 10
= 99

PROCESSING BY COMPARISON UNIT

| FIRST NORMALIZATION UNIT OUTPUT −
SECOND NORMALIZATION UNIT OUTPUT |
= | 100 − 99 |
= 1 > 0.5 → NO GOOD

FIG. 7

FIRST (N − 1)-BIT CONVERSION UNIT OUTPUT

| N-BITS | PRE-CONVERSION INPUT | |
|---|---|---|
| 98 | | 9 8 |
| 99 | | 1 0 0 |
| 100 | CNC | |
| 101 | | 1 0 2 |
| 102 | | |
| 103 | | 1 0 4 |

PROCESSING BY FIRST COHERENT ADDITION UNIT AND FIRST NORMALIZATION UNIT

(100 + 100 + 102 + 100 + 100
+ 100 + 100 + 100 + 100 + 100) / 10
= 1002 / 10
= 100.2

SECOND (N − 1)-BIT CONVERSION UNIT OUTPUT

| N-BITS | PRE-CONVERSION INPUT | |
|---|---|---|
| 98 | | 9 9 |
| 99 | | 1 0 1 |
| 100 | CNC | |
| 101 | | |
| 102 | | 1 0 3 |
| 103 | | |

PROCESSING BY SECOND COHERENT ADDITION UNIT AND SECOND NORMALIZATION UNIT

(101 + 99 + 101 + 101 + 101
+ 101 + 101 + 101 + 101 + 101) / 10
= 1008 / 10
= 100.8

PROCESSING BY COMPARISON UNIT

| FIRST NORMALIZATION UNIT OUTPUT −
SECOND NORMALIZATION UNIT OUTPUT |
= | 100.2 − 100.8 |
= 0.6 > 0.5 → NO GOOD

| N-BIT QUANTIZATION DATA | FIRST (N − 1)-BIT CONVERSION OUTPUT | SECOND (N − 1)-BIT CONVERSION OUTPUT | DIFFERENCE |
|---|---|---|---|
| 0 | 0 | −1 | +1 |
| 1 | 0 | 1 | −1 |
| 2 | 2 | 1 | +1 |
| 3 | 2 | 3 | −1 |
| 4 | 4 | 3 | +1 |
| 5 | 4 | 5 | −1 |
| 6 | 6 | 5 | +1 |
| 7 | 6 | 7 | −1 |
| ⋮ | ⋮ | ⋮ | ⋮ |
| 255 | 254 | 255 | −1 |

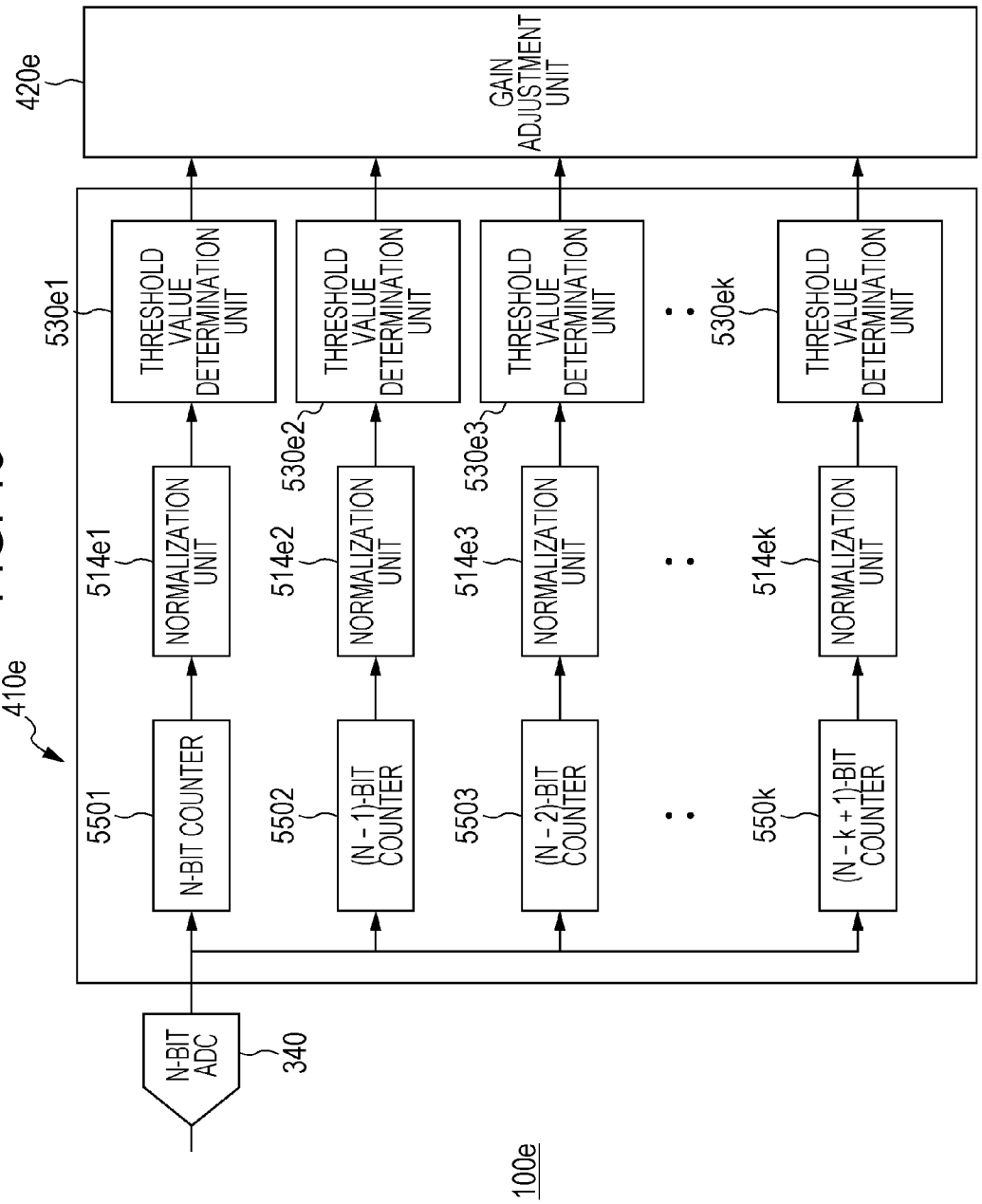

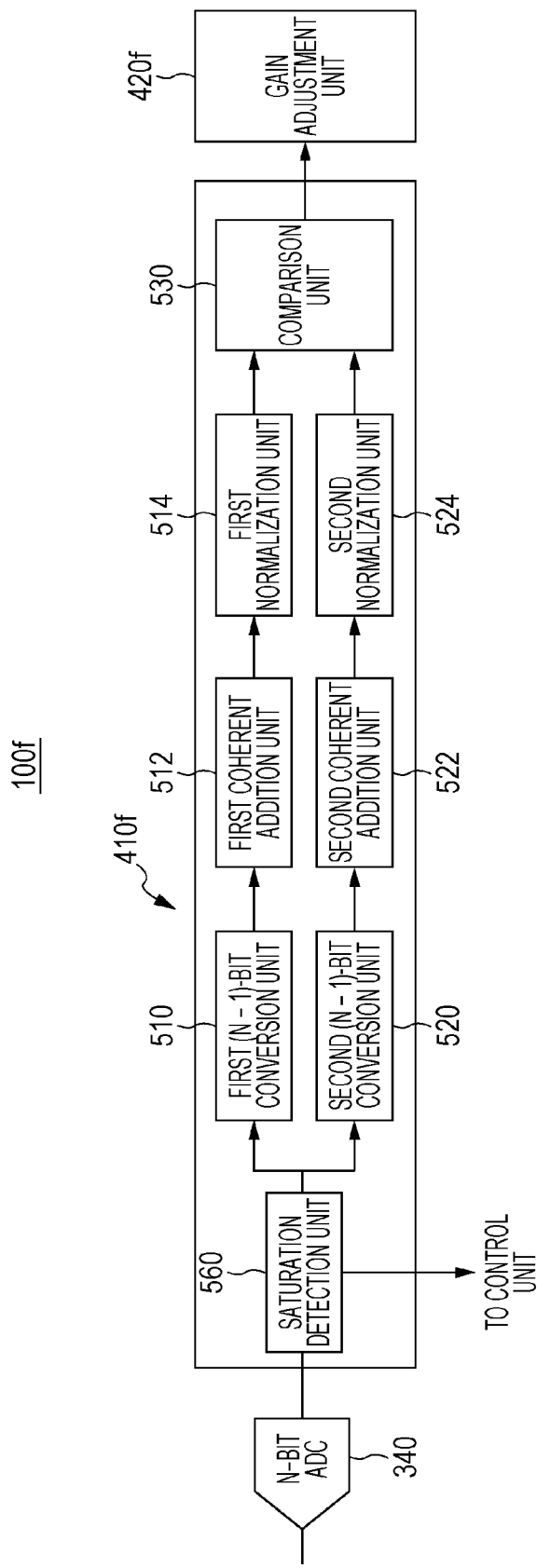

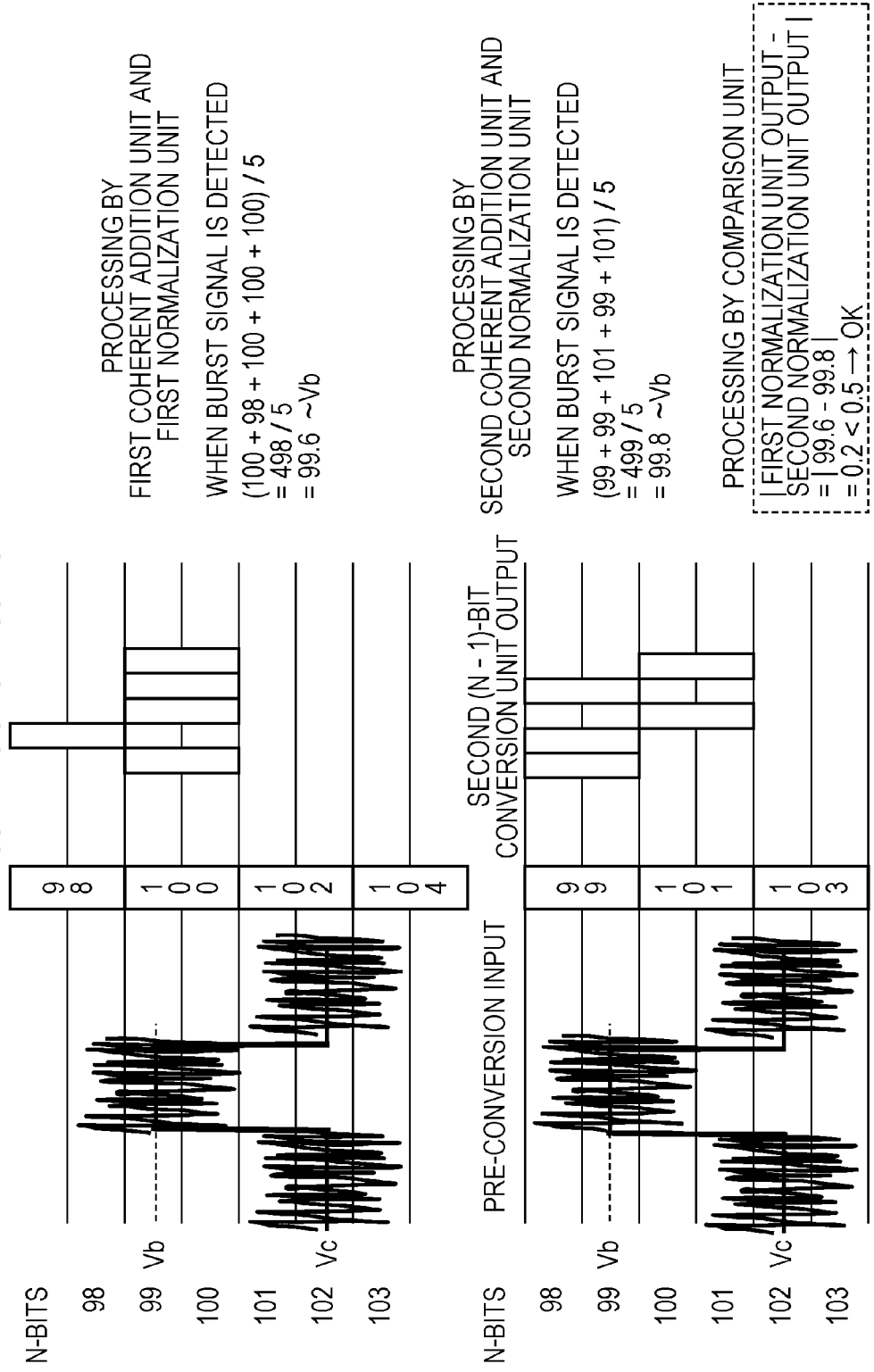

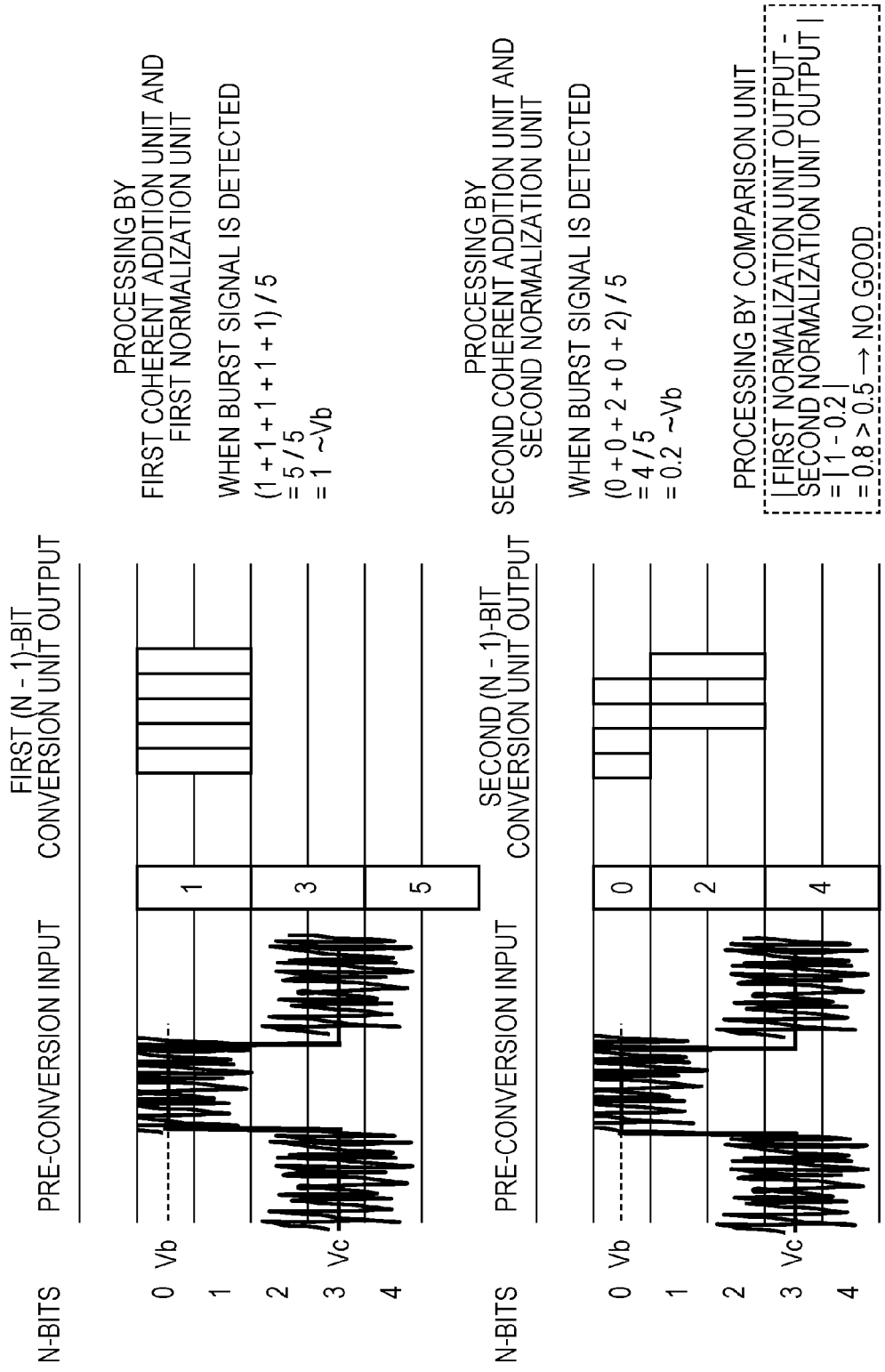

RADAR DEVICE

CROSS REFERENCES TO RELATED APPLICATIONS

This application claims priority to Japanese Patent Application No. 2014-015950, filed on Jan. 30, 2014, the contents of which are hereby incorporated by reference.

BACKGROUND

1. Technical Field

The present disclosure relates to a radar device that detects a reflected wave signal that is reflected by a target.

2. Description of the Related Art

Radar devices have a configuration that includes an analog circuit unit that converts a high-frequency reflected wave signal received in a reception antenna into a baseband signal, and a digital circuit unit that carries out prescribed signal processing on the baseband signal. The gain of the analog circuit unit (for example, a variable gain amplifier (VGA)) fluctuates due to fluctuations in the temperature around the radar device.

Therefore, in a case where the gain deviates from a predefined assumed value, it becomes difficult for a radar device to detect desired reception signals, and detection accuracy for reflected wave signals in the radar device deteriorates. Radar devices are thus required to suppress gain fluctuations even when temperature fluctuations occur.

In "Resolution Below the Least Significant Bit in Digital Systems with Dither", John Vanderkooy and Stanley P. Lipshitz, *J. Audio Eng Soc.*, Vol. 32, No. 3, 1984 March, it is disclosed that, by applying a thermal noise signal of a prescribed level, a signal in an analog-digital converter (ADC) is quantized with high resolution by dithering.

In Japanese Unexamined Patent Application Publication No. 2005-77137, it is disclosed that in order to increase the resolution of signal quantization in an ADC by dithering, a noise generator that generates a prescribed dither signal (white noise) and a digital low-pass filter that removes high-frequency components (noise components) caused by the addition of the dither signal from quantization data output from the ADC are provided, and quantization errors in sampling are reduced and the resolution of signal quantization of the ADC is improved even when the bit length of the ADC is short.

SUMMARY

The inventors investigated a radar device that detects a reflected wave signal that is reflected by a target. In the configuration of Japanese Unexamined Patent Application Publication No. 2005-77137, there is a problem in that in a case where gain fluctuates in response to temperature fluctuations around the radar device, it is difficult to use dithering to adjust the gain in order to increase the resolution of signal quantization in the ADC.

One non-limiting and exemplary embodiment provides a radar device that adjusts gain in order to quantize a signal with high resolution by dithering regardless of whether or not there are temperature fluctuations.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature a radar device provided with: a transmitter that transmits a high-frequency radar transmission signal from a transmission antenna; a controller that controls execution or stopping of transmission of the radar transmission signal; a receiver that amplifies a thermal noise signal inputted from reception antenna by using an initial gain value and quantize the amplified thermal noise signal, while the transmission of the radar transmission signal is stopped; and a gain controller that adjusts the prescribed gain value to a gain value suitable for dithering of the thermal noise signal, based on the quantized thermal noise signal.

These general and specific aspects may be implemented using a system, a method, and a computer program, and any combination of systems, method, and computer programs.

According to the present disclosure, it is possible to adjust a gain value for quantizing a signal with high resolution by dithering regardless of whether or not there are temperature fluctuations.

BRIEF DESCRIPTION OF THE DRAWINGS

FIG. 1 is an illustrative drawing depicting the basic concept of a gain value in a radar device of the embodiments;

FIG. 2 is a block diagram depicting the internal configuration of a radar device of the embodiments (for example, the radar device of the first embodiment);

FIG. 5A is a schematic drawing depicting the amplitude of a thermal noise signal required for dithering, with respect to a thermal noise signal having a level that is in the center of 1 LSB, in a quantization resolution N-bit ADC, and FIG. 5B is a schematic drawing depicting the amplitude of a thermal noise signal required for dithering, with respect to a thermal noise signal having a level that is close to the lower bound of 1 LSB, in a quantization resolution N-bit ADC;

FIG. 6 is an illustrative drawing depicting an example of quantization data obtained after bit conversion by the first (N−1)-bit conversion unit and the second (N−1)-bit conversion unit with respect to a low-level thermal noise signal, and a result regarding the suitability of a gain value used for dithering;

FIG. 7 is an illustrative drawing depicting an example of quantization data obtained after bit conversion by the first (N−1)-bit conversion unit and the second (N−1)-bit conversion unit with respect to a thermal noise signal the level of which has a small fluctuation range, and a result regarding the suitability of a gain value used for dithering;

FIG. 15 is a block diagram depicting the internal configuration of a determination unit of a radar device of a sixth embodiment;

FIG. 16 is a block diagram depicting the internal configuration of a determination unit of a radar device of a seventh embodiment;

FIG. 17 is an illustrative drawing depicting an example of quantization data obtained after bit conversion by the first (N−1)-bit conversion unit and the second (N−1)-bit conversion unit with respect to the input of a thermal noise signal and a burst signal to a resolution N-bit ADC, and a result regarding the suitability of a gain value used for dithering;

FIG. 18 is an illustrative drawing depicting an example of quantization data obtained after bit conversion by the first (N−1)-bit conversion unit and the second (N−1)-bit conversion unit with respect to the input of a saturated burst signal to the resolution N-bit ADC, and a result regarding the suitability of a gain value used for dithering;

FIG. 19A is a drawing in which the signal noise rate (SNR) value of a thermal noise signal is large (thermal noise signal having a low amplitude), and FIG. 19B is a drawing in which the SNR value of a thermal noise signal is small (thermal noise signal having a high amplitude);

FIG. 20A is a drawing depicting the result of dithering in which a thermal noise signal having a large SNR value is used, and FIG. 20B is a drawing depicting the result of dithering in which a thermal noise signal having a small SNR value is used.

DETAILED DESCRIPTION (Underlying Knowledge Forming the Basis of the Radar Devices of the Embodiments According to the Present Disclosure)

To begin, before describing the embodiments of the radar device according to the present disclosure, the underlying knowledge forming the basis of the radar device of the embodiments will be described.

First, simulation results of high-resolution quantization in which dithering is used will be presented.

Figure 19A:
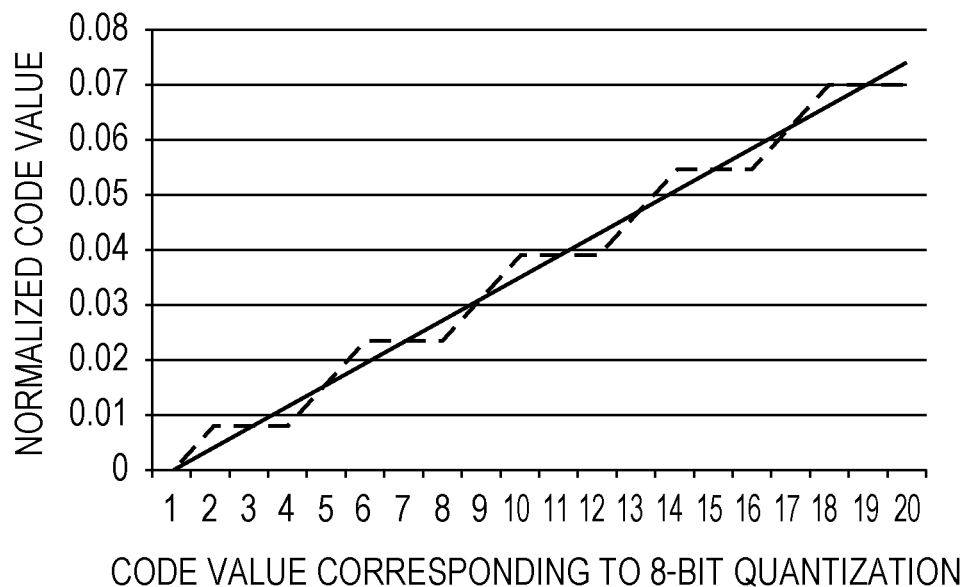
FIG. 19A and FIG. 19B are drawings that compare 8-bit quantization data (solid lines) and 6-bit quantization data produced by dithering in which a thermal noise signal is used (dashed lines), and depict the effect of dithering in which a thermal noise signal is used, where
Figure 19B:
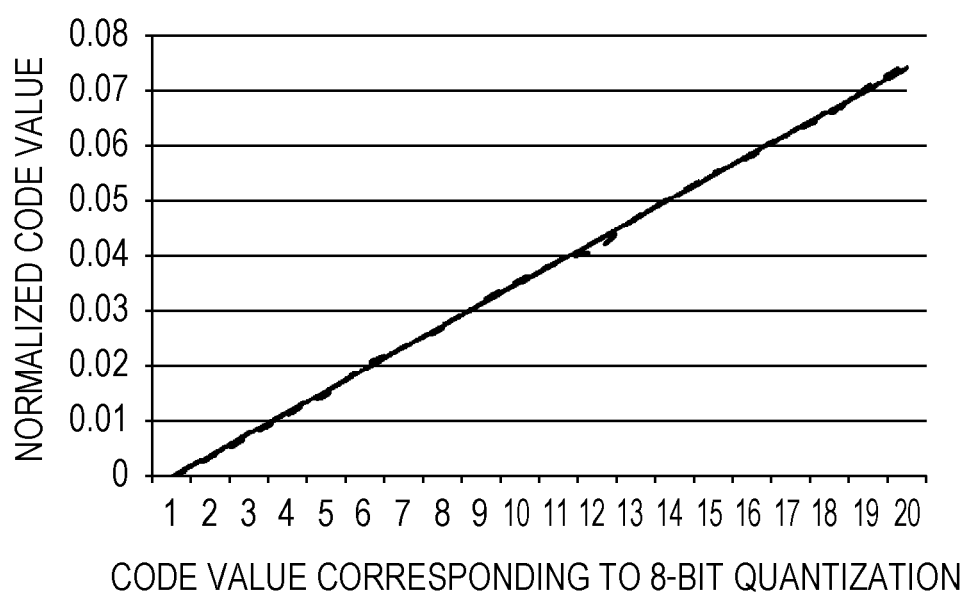

FIG. 19A and FIG. 19B are drawings that compare 8-bit quantization data (solid lines) and 6-bit quantization data produced by dithering in which a thermal noise signal is used (dashed lines), and depict the effect of dithering in which a thermal noise signal is used. In FIG. 19A, the signal noise rate (SNR) value of a thermal noise signal is large (thermal noise signal having a low amplitude) and, in FIG. 19B, the SNR value of a thermal noise signal is small (thermal noise signal having a high amplitude).

It should be noted that the horizontal axes are code values corresponding to 8-bit quantization, and the vertical axes are code values obtained after normalization. That is, the code value 256 becomes 1.

FIG. 19A depicts the plotting of 8-bit quantization data (solid line) that are values obtained by quantizing a monotonically increasing signal at 8-bit resolution and carrying out normalization, and 6-bit quantization data (dashed line) that are values obtained by adding a thermal noise signal having a large SNR value to a monotonically increasing signal, performing quantization at 6-bit resolution, and normalizing the result of performing coherent addition 20,000 times.

In FIG. 19A, in the 6-bit quantization data (dashed line), a resolution corresponding to 6-bit quantization data is obtained. Due to the added thermal noise signal having a large SNR value, the 6-bit quantization data is a gain value that is unsuitable for dithering, and is output as 6-bit quantization data.

Figure 8:
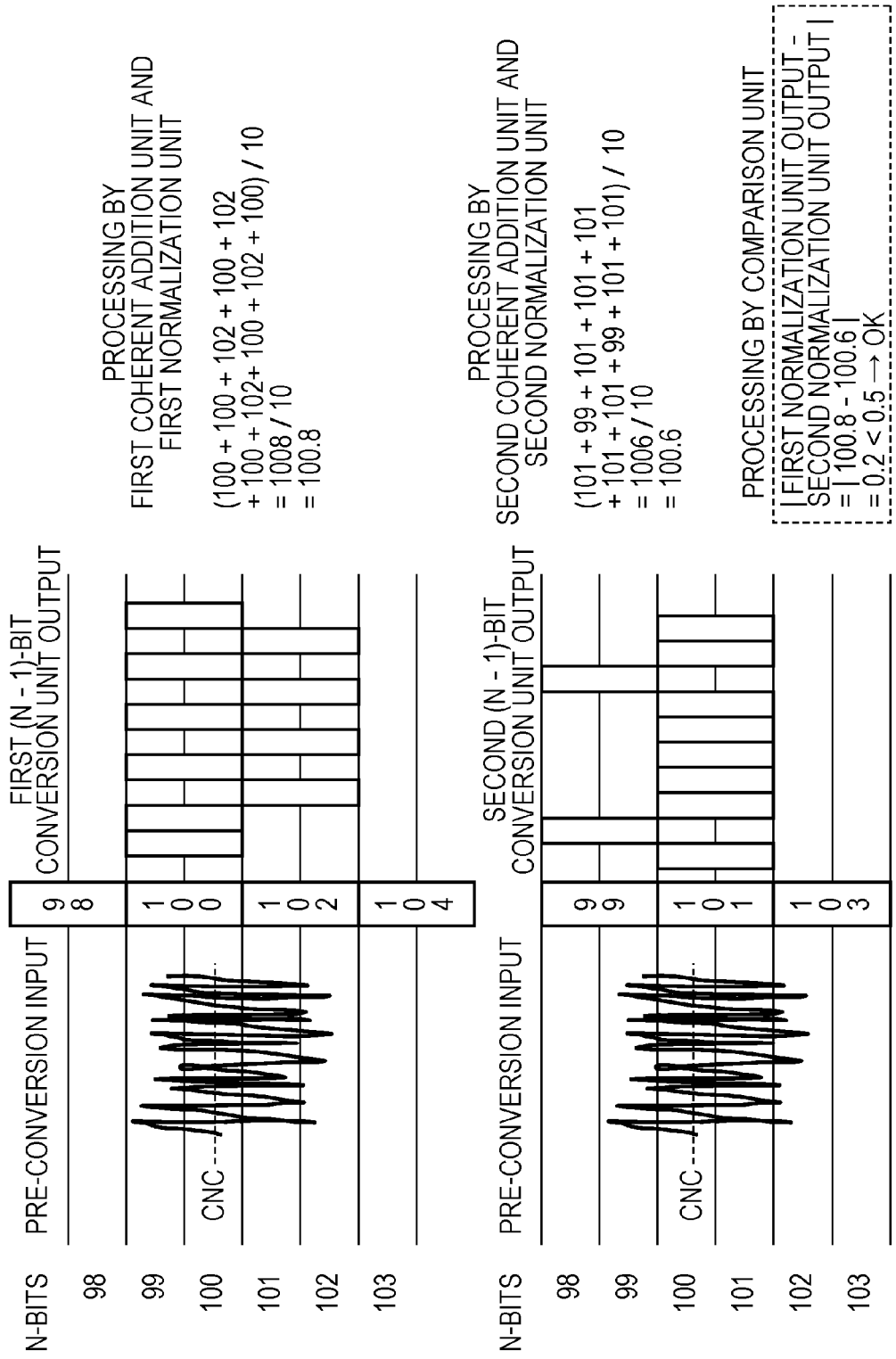
FIG. 8 is an illustrative drawing depicting an example of quantization data obtained after bit conversion by the first (N−1)-bit conversion unit and the second (N−1)-bit conversion unit with respect to a thermal noise signal the level of which has a large fluctuation range, and a result regarding the suitability of a gain value used for dithering.

In FIG. 19B, 8-bit resolution quantization data (solid line), and 6-bit quantization data (dashed line) that are values obtained by adding a thermal noise signal having a small SNR value, performing quantization at 6-bit resolution, and normalizing the result of performing coherent addition 20,000 times, are plotted.

In FIG. 19B, the 6-bit quantization data (dashed line) are gain values that are suitable for dithering due to the SNR value being small, and quantization data corresponding to 8 bits is output. That is, by setting a gain value that is suitable for dithering, high-resolution quantization in which 6-bit resolution corresponds to 8-bit resolution is possible.

Figure 20A:
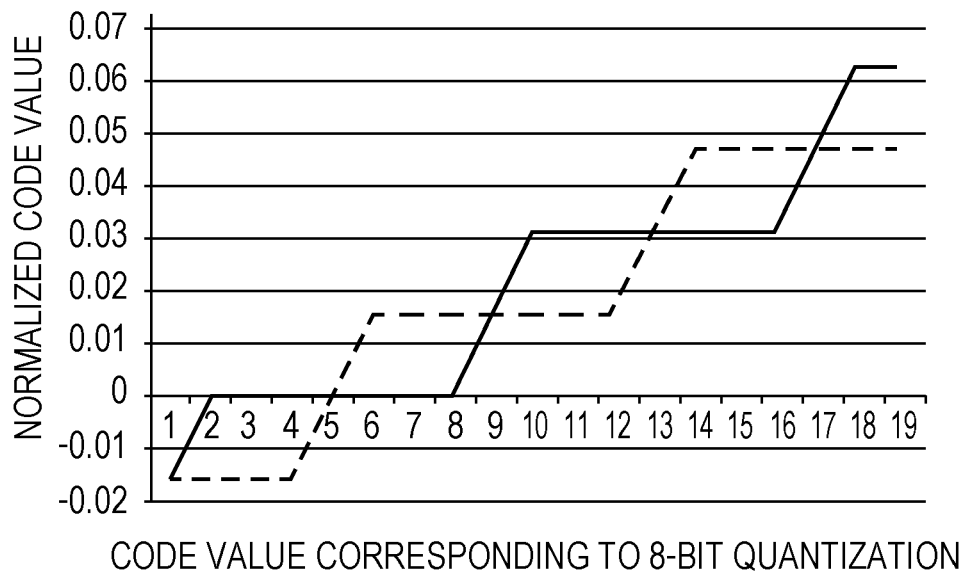
FIG. 20A and FIG. 20B are drawings that compare data obtained by quantizing an analog signal with 5-bit resolution (solid lines) and data obtained by quantizing, with 5-bit resolution, an analog signal to which an analog signal corresponding to 1 LSB of 6 bits is added, and then subtracting a digital signal corresponding to 1 LSB of 6 bits (dashed lines), and depict the effect of dithering by adding/subtracting a signal not exceeding 1 LSB, where
Figure 20B:
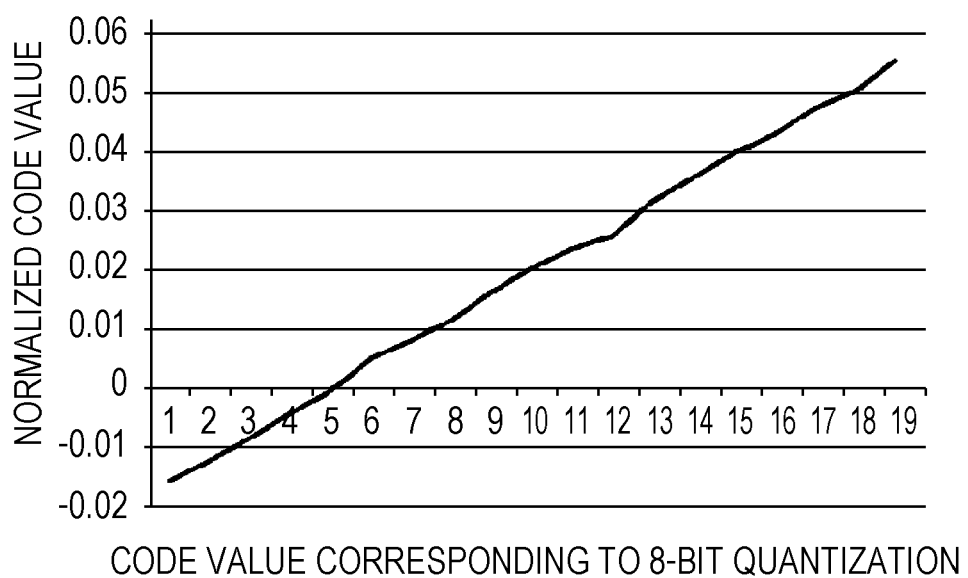

FIG. 20A and FIG. 20B are drawings that compare data obtained by quantizing an analog signal with 5-bit resolution (solid lines) and data obtained by quantizing, with 5-bit resolution, an analog signal to which an analog signal corresponding to 1 LSB of 6 bits is added, and then subtracting a digital signal corresponding to 1 LSB of 6 bits (dashed lines), and depict the effect of dithering by adding/subtracting a signal not exceeding 1 LSB, where FIG. 20A is a drawing depicting the result of dithering in which a thermal noise signal having a large SNR value is used, and FIG. 20B is a drawing depicting the result of dithering in which a thermal noise signal having a small SNR value is used.

In FIG. 20A, because a thermal noise signal having a large SNR value is added, the dithering is unsuitable, and a difference occurs between 5-bit quantization data (solid line) and 5-bit quantization data (dashed line). That is, the added analog signal corresponding to 1 LSB of 6 bits is not decomposed during the 5-bit quantization, and a difference is therefore produced by the subtraction of a digital signal corresponding to 1 LSB of 6 bits.

In FIG. 20B, because a thermal noise signal having a small SNR value is added, the dithering is suitable, and the 5-bit quantization data (solid line) and the 5-bit quantization data (dashed line) coincide. That is, the added analog signal corresponding to 1 LSB of 6 bits is resolved during the 5-bit quantization, and is offset by the subtraction of a digital signal corresponding to 1 LSB of 6 bits. In addition, in FIG. 20B, the 5-bit quantization data (solid line) and the 5-bit quantization data (dashed line) become output that is proportional to a code value that corresponds to 8-bit quantization, and therefore the effect of the increase in resolution due to dithering is a resolution that corresponds to 8 bits.

Figure 21:
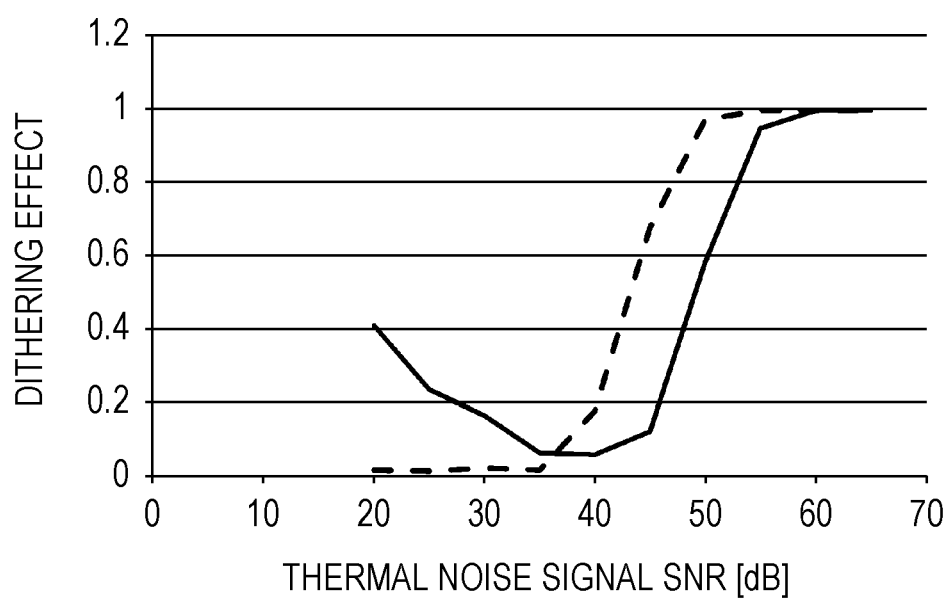
FIG. 21 is a drawing depicting the relationship between the SNR of a thermal noise signal and the effect of dithering.

FIG. 21 is a drawing depicting the relationship between the SNR of a thermal noise signal and the effect of dithering. The dithering (solid line) according to the conditions of FIGS. 19A and 19B, and the dithering (dashed line) according to the conditions of FIGS. 20A and 20B are depicted.

The horizontal axis is the SNR of a thermal noise signal, and the vertical axis indicates the effect of dithering and is a value obtained by normalizing the difference due to the increase in resolution. On the vertical axis, the effect of dithering at its lowest is 0, and the effect of dithering at its highest is 1.

That is, a dithering effect can be obtained by the SNR of a thermal noise signal increasing to be equal to or greater than a fixed level. Furthermore, in FIG. 21, the trends of both effects due to dithering more or less coincide, and there is an SNR difference of 6 dB between the two.

It should be noted that in conventional technology including the aforementioned Japanese Unexamined Patent Application Publication No. 2005-77137, a configuration that applies an external signal as a reference is required in order for dithering to be used to increase the resolution of signal quantization in an ADC. For example, in Japanese Unexamined Patent Application Publication No. 2005-77137, a noise generator that generates a prescribed dither signal (white noise) is provided. Providing a noise generator as a circuit component of a radar device is undesirable in practical use outside of a laboratory.

Furthermore, apart from adding a noise generator, a circuit component and signal wiring that cause a signal to loop back from a transmission unit of the radar device to a reception unit are required. Here, in order to use a method for looping back a signal, prior adjustment is required with regard to the arrangement of circuit components in order to suppress deterioration of the characteristics of the radar device due to the signal wiring provided between the transmission unit and the reception unit, and the work of the designer of the radar device becomes complex.

Therefore, in conventional technology including the aforementioned Japanese Unexamined Patent Application Publication No. 2005-77137, a problem occurs in that, in a radar device, in order to use dithering to increase the resolution of signal quantization in an ADC, the number of circuit components increases, and the circuit scale increases.

Furthermore, because the gain of the analog circuit unit (for example, the VGA) of the radar device fluctuates in response to fluctuations in the surrounding temperature, the desired level of a reception signal in the radar device fluctuates. Therefore, in the radar device, in order to suppress the influence of gain fluctuations (for example, deterioration of the reception characteristics of the radar device) even when the gain fluctuates, it is necessary to adjust gain in order to increase the resolution of signal quantization by the ADC with the use of dithering.

Consequently, the addition of a circuit component that applies an external signal as a reference is omitted in the embodiments hereafter, and an example of a radar device having a gain adjustment unit that quantizes a signal with high resolution by dithering regardless of whether or not there are temperature fluctuations is described with reference to the drawings.

(Basic Concept of a Gain Value Common to the Radar Devices of the Embodiments)

To begin, the basic concept of a gain value common to radar devices 100 to 100f of the embodiments is described with reference to FIG. 1 and FIG. 2. FIG. 1 is an illustrative drawing depicting the basic concept of a gain value in the radar devices 100 to 100f of the embodiments. The vertical axis in FIG. 1 indicates the level of a signal.

FIG. 2 is a block diagram depicting the internal configuration of a radar device of the embodiments (for example, the radar device 100 of the first embodiment). Hereafter, when describing the operation of the radar devices 100 to 100f of the embodiments, the radar device 100 of the first embodiment is described as an example, the differences with the first embodiment are described in the second embodiment and thereafter, and descriptions of the same content are simplified or omitted.

The radar device 100 depicted in FIG. 2 is a configuration including a control unit CNT, a transmission unit TX to which a transmission antenna At-tx is connected, a reception unit RX to which a reception antenna At-rx is connected, and a gain control unit GCNT.

The transmission unit TX includes a pulse sequence generation unit 210, a digital-analog converter (DAC) 220, a mixer (MIX) 230, and a power amplification unit (PA) 240 to which the transmission antenna At-tx is connected. The reception unit RX includes a low noise amplifier (LNA) 310 to which the reception antenna At-rx is connected, a mixer (MIX) 320, a variable gain amplifier (VGA) 330, an analog-digital converter (ADC) 340, a correlator 350, and a coherent addition unit 360. The gain control unit GCNT includes a determination unit 410 and a gain adjustment unit 420.

In the radar device 100, a high-frequency radar transmission signal LTX generated by the transmission unit TX is transmitted from the transmission antenna At-tx, and a reflected wave signal RRX obtained by the radar transmission signal LTX being reflected by an object TRG is received in the reception antenna At-rx. The power of the reflected wave signal RRX increases as the position of the object TRG serving as a target becomes closer to the radar device 100, and the power of the reflected wave signal RRX decreases as the position of the object TRG serving as the target becomes further away from the radar device 100.

In a case where a reflected wave signal RRX that is reflected by an object TRG positioned at a close distance to the radar device 100 is within the dynamic range of the ADC 340, or in other words, within the level difference between the level L1 and the level L0 depicted in FIG. 1, without being saturated in the ADC 340, the correlator 350 detects the reflected wave signal RRX.

On the other hand, with regard to a reflected wave signal RRX that is reflected by an object TRG positioned at a remote distance from the radar device 100, the correlator 350 detects the reflected wave signal RRX by the dithering indicated in, for example, "Resolution Below the Least Significant Bit in Digital Systems with Dither", John Vanderkooy and Stanley P. Lipshitz, *J. Audio Eng Soc*., Vol. 32, No. 3, 1984 March, or in other words, by high-resolution signal quantization of the quantization resolution (N bits) or greater of the ADC 340. Hereafter, the quantization resolution of the ADC 340 is taken as "N bits" with N being an integer of 2 or more.

In the radar device 100, the gain value of the VGA 330 is set to a suitable value in order to detect a reflected wave signal from a close distance assumed in advance, and a reflected wave signal from a remote distance assumed in advance. Thus, the radar device 100 receives a reflected wave signal from a close distance assumed in advance, without saturating the reflected wave signal, within the dynamic range DRG (see FIG. 1) of the ADC 340, and, in addition, detects thermal noise (signal) of a level in order for the reflected wave signal RRX to be quantized with high resolution by dithering. It should be noted that the dynamic range DRG of the ADC 340 is a prescribed value that is indicated by the difference between the level L1 and the level L0 depicted in FIG. 1, and is defined in advance.

It is known that the gain value of the VGA 330 of the radar device 100 fluctuates due to surrounding temperature fluctuations. For example, in FIG. 1, the desired level range RSL of a reception signal in the radar device 100 moves in a parallel manner in the vertical direction in response to fluctuations in the gain value. Therefore, even with a gain value of the VGA 330 with which it is possible to detect a reflected wave signal from a close distance assumed in advance and a reflected wave signal from a remote distance assumed in advance, it is necessary to readjust the gain value due to fluctuations in the gain value.

In the radar device 100, the difference between the level L2 of a thermal noise signal used for high-resolution quantization by dithering, and the level L3 of the power of a reflected wave signal RRX reflected by an object TRG at the closest distance from the radar device 100 or an object TRG having the largest reflection cross-sectional area (radar cross section: RCS), or in other words, the desired level range RSL of a reception signal in the radar device 100, is fixed (see FIG. 1).

Therefore, the radar device 100 sets the level range RSL depicted in FIG. 1 from the range of the dynamic range DRG of the ADC 340 to the quantization resolution in the signal quantization of the ADC 340, and adjusts the gain level for the level L2 of the thermal noise signal used in high-resolution quantization by dithering to be input.

Thus, the radar device 100 is able to receive a reflected wave signal RRX reflected by an object TRG at the closest distance from the radar device 100 or an object TRG having the largest reflection cross-sectional area (RCS) without saturating the reflected wave signal RRX, and, in addition, is able to quantize an input signal with high resolution in the ADC 340 by dithering.

To rephrase, with respect to fluctuations in the gain value due to temperature fluctuations, the radar device 100 controls a signal input to the radar device 100 into a non-signal state, and adjusts the gain value of the VGA 330 in such a way that the level of a thermal noise signal inserted to the radar device 100 becomes the level L2 for quantizing a reflected wave signal RRX with high resolution by dithering. Thus, the radar device 100 is able to quantize an input signal in the ADC 340 with high resolution by dithering, and, in addition, is able to receive a reflected wave signal RRX reflected by an object TRG at the closest distance from the radar device 100 or an object TRG having the largest reflection cross-sectional area (RCS) without saturating the reflected wave signal RRX.

It should be noted that, in the radar device 100, in order for the desired level range RSL of a reception signal in the radar device 100 to fit within the dynamic range DRG of the ADC 340, it is preferable for the thermal noise signal level L2 for quantizing an input signal in the ADC 340 with high-resolution by dithering to be reduced as much as possible. Therefore, the radar device 100 may add a prescribed margin to the gain value of the VGA 330 for providing the thermal noise signal level L2 (see FIG. 5B described hereafter).

Hereafter, the specific internal configurations and operations of the radar devices 100 to 100*f* of the embodiments are described in detail.

First Embodiment

In FIG. 2, the control unit CNT controls the execution or stopping of the transmission of a radar transmission signal LTX in the radar device 100. Specifically, for example, in a case where a fluctuation in the temperature around the radar device 100 is detected, the control unit CNT outputs a control signal for stopping the transmission of the radar transmission signal LTX, to the transmission unit TX, outputs a control signal for adjusting the gain value of the VGA 330 to the gain control unit GCNT, and, in addition, outputs a control signal for executing processing for the detection of a thermal noise signal to the reception unit RX.

On the other hand, in a case where a fluctuation in the temperature around the radar device 100 is not detected, the control unit CNT outputs, to the transmission unit TX, a control signal for executing the transmission of the radar transmission signal LTX, and outputs, to the reception unit RX, a control signal for executing processing for the detection of a reflected wave signal RRX obtained by the radar transmission signal LTX being reflected by an object TRG. It should be noted that the detection result regarding a fluctuation in the temperature around the radar device 100 may be detected by the radar device 100, or may be detected with an external signal (not depicted) that is input to the radar device 100.

During the execution of the transmission of the radar transmission signal LTX, the transmission unit TX converts a prescribed transmission code sequence into a high-frequency radar transmission signal LTX and transmits this from the transmission antenna At-tx.

At each prescribed transmission cycle, the pulse sequence generation unit 210 generates a prescribed code sequence (for example, a single pulse sequence) and outputs this to the DAC 220, in accordance with a control signal output by the control unit CNT when a fluctuation in the temperature around the radar device 100 is not detected.

The DAC 220 converts a digital transmission code sequence (transmission signal) generated by the pulse sequence generation unit 210 into an analog transmission signal and outputs this to the mixer 230. The mixer 230 uses a local signal that is output from a local signal oscillator that is not depicted, to convert the transmission signal output by the DAC 220 into a high-frequency radar transmission signal LTX and outputs this to the power amplification unit 240. The power amplification unit 240 amplifies the power of the radar transmission signal LTX and transmits this from the transmission antenna At-tx. A reflected wave signal RRX obtained by the radar transmission signal LTX being reflected by the object TRG is received in the reception antenna At-rx.

During the execution of the transmission of the radar transmission signal LTX, the reception unit RX receives, at the reception antenna At-rx, a reflected wave signal RRX obtained by the radar transmission signal LTX being reflected by the object TRG, and detects whether or not there is an object TRG on the basis of the amplified and quantized reflected wave signal RRX. Furthermore, while the transmission of the radar transmission signal LTX is stopped, the reception unit RX uses a prescribed gain value to amplify and quantize a thermal noise signal that is input to the radar device 100. It should be noted that, while the transmission of the radar transmission signal LTX is stopped, the output of the reception unit RX is input to the gain control unit GCNT.

The LNA 310 amplifies the power of the reflected wave signal RRX received in the reception antenna At-rx and outputs the amplified reflected wave signal RRX to the mixer 320. The mixer 320 uses a local signal that is output from a local signal oscillator that is not depicted, to convert the high-frequency reflected wave signal RRX received in the reception antenna At-rx into a baseband signal and outputs this to the VGA 330.

The VGA 330 uses the gain value (for example, an initial value G0 or an altered gain value G) set by the gain control unit GCNT to amplify the level of the output signal (for example, the baseband signal corresponding to the reflected wave signal RRX or the thermal noise signal) of the mixer 320 and output the amplified output signal to the ADC 340.

The ADC 340 uses a prescribed quantization resolution (N bits) to AD-convert (for example, sample processing and quantization processing) the output signal (analog signal) of the VGA 330 into a digital signal and output this to the correlator 350. It should be noted that the output signal of the ADC 340 is input to both the correlator 350 and the determination unit 410 in accordance with a control signal output by the control unit CNT when, for example, a fluctuation in the temperature around the radar device 100 is detected. Furthermore, the output signal of the ADC 340 is input to the correlator 350 in accordance with a control signal output by the control unit CNT when, for example, a fluctuation in the temperature around the radar device 100 is not detected.

At each transmission cycle of the radar transmission signal LTX, the correlator 350 calculates an autocorrelation value between the transmission code sequence (transmission signal) generated by the pulse sequence generation unit 210 and the digital signal output by the ADC 340, and outputs the auto correlation value to the coherent addition unit 360. The coherent addition unit 360 performs coherent addition on the correlation calculation values calculated by the correlator 350 at each transmission cycle for a prescribed number of times that coherent addition is to be performed (for example, 10,000 times), and on the basis of a delay time in which a peak correlation calculation value is detected, measures (distance measurement) the distance between the object TRG and the radar device 100.

It should be noted that, in order to simplify the description, an example has been described in which, in the radar device 100 depicted in FIG. 2, there is one transmission unit TX to which the transmission antenna At-tx is connected and there is one reception unit RX to which the reception antenna At-rx is connected; however, a plurality thereof may be provided. For example, a radar device 100 that has a plurality of transmission units to which a transmission antenna is connected is able to transmit a radar transmission beam in which the directivity of a radar transmission signal is formed in a prescribed direction.

Furthermore, a radar device 100 that has a plurality of reception units to which a reception antenna is connected and, in addition, has one arrival direction estimation unit at the stage subsequent to the coherent addition unit of each reception unit is able to calculate an estimation value for the orientation from the radar device 100 toward an object TRG.

Furthermore, the radar device 100 is able to improve the distance measurement accuracy or the orientation estimation accuracy for the object TRG serving as a target, by using coherent addition results for a prescribed number of times for the correlation calculation results of the correlator 350 in the coherent addition unit 360.

While the transmission of the radar transmission signal LTX is stopped, the gain control unit GCNT uses an output signal of the ADC 340, or in other words, quantization data of a thermal noise signal that has been input to the radar device 100, to determine whether or not it is necessary to adjust the gain value that is set in the VGA 330.

For example, in a case where a fluctuation in the temperature around the radar device 100 is detected, the determination unit 410 uses the output signal of the ADC 340, or in other words, the quantization data of the thermal noise signal in the ADC 340, to determine the suitability of the gain value used for the dithering of the thermal noise signal that has been input to the radar device 100, in accordance with a control signal output by the control unit CNT. In other words, the determination unit 410 determines the suitability of the gain value used for the dithering of the thermal noise signal, in a state in which the thermal noise signal has been input to the radar device 100. The determination result of the determination unit 410 is input to the gain adjustment unit 420. It should be noted that the specific internal configuration of the determination unit 410 is described hereafter with reference to FIG. 3A.

For example, in a case where a fluctuation in the temperature around the radar device 100 is detected, the gain adjustment unit 420 uses the determination result of the determination unit 410 to adjust the gain value that is set in the VGA 330, in accordance with the control value output by the control unit CNT. For example, in a case where the determination unit 410 determines that the gain value is suitable for the dithering of the thermal noise signal, the gain adjustment unit 420 maintains the present gain value set in the VGA 330. On the other hand, in a case where the determination unit 410 determines that the gain value is unsuitable for the dithering of the thermal noise signal, the gain adjustment unit 420 adjusts the present gain value that is set in the VGA 330 to a gain value obtained by adding a fixed gain increase value $\Delta G$ (see FIG. 9). The operational procedure of the gain adjustment unit 420 of the present embodiment is described hereafter with reference to FIG. 9.

It should be noted that, in the embodiments including the present embodiment, prerequisites for the units of the gain control unit GCNT to operate are that the transmission unit TX has stopped transmission of the radar transmission signal LTX in accordance with a control signal output by the control unit CNT, and, in addition, that a signal is not input from outside due to there being no other radar device in the periphery of the radar device 100. Accordingly, the radar device 100 is in a state in which a thermal noise signal has been input. In the reception unit RX of the radar device 100, a common voltage for each unit of the reception unit RX is set according to the level of the thermal noise signal, and the ADC 340 performs quantization on a signal obtained by the level of the thermal noise signal being added to the common voltage.

(Determination Unit of the First Embodiment)

Figures 3A, 3B:
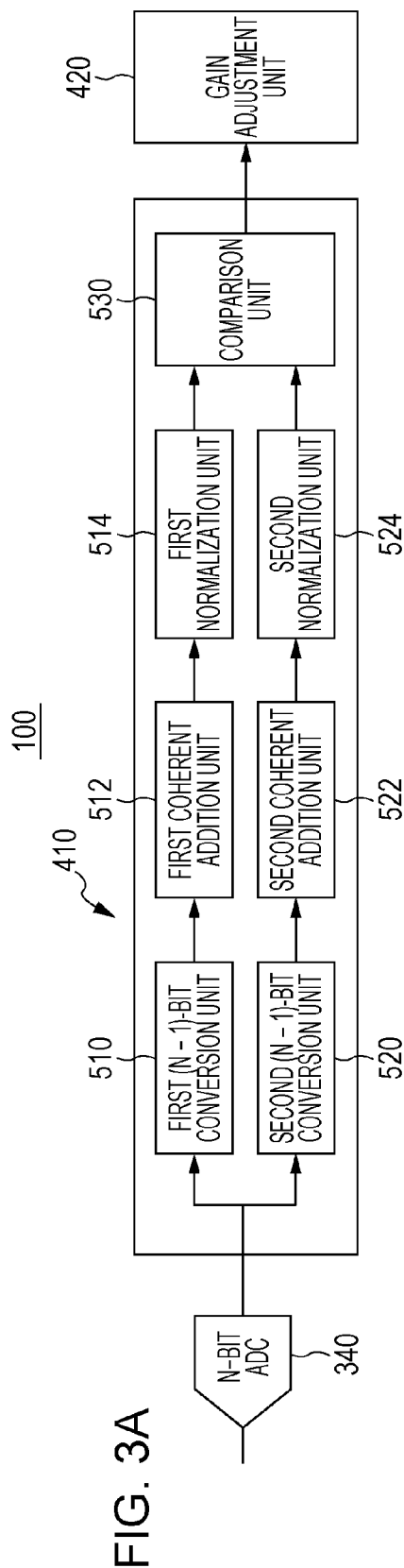
FIG. 3A is a block diagram depicting the internal configuration of a determination unit of the radar device of the first embodiment.
FIG. 3B is a drawing depicting the correlation between N-bit quantization data that is input, quantization data obtained after bit conversion by a first (N−1)-bit conversion unit, and quantization data output obtained after bit conversion by a second (N−1)-bit conversion unit.

Next, the configuration and operation of the determination unit 410 in the radar device 100 of the first embodiment are described with reference to FIG. 3A, FIG. 3B, and FIG. 4 to FIG. 8. FIG. 3A is a block diagram depicting the internal configuration of the determination unit 410 of the radar device 100 of the first embodiment. FIG. 3B is a drawing depicting the correlation between N-bit quantization data that is input, quantization data obtained after bit conversion by a first (N−1)-bit conversion unit 510, and quantization data obtained after bit conversion by a second (N−1)-bit conversion unit 520.

The determination unit 410 depicted in FIG. 3A has the first (N−1)-bit conversion unit 510, the second (N−1)-bit conversion unit 520, a first coherent addition unit 512, a second coherent addition unit 522, a first normalization unit 514, a second normalization unit 524, and a comparison unit 530. Quantization data of the ADC 340 that has N-bit quantization resolution is input to the first (N−1)-bit conversion unit 510 and the second (N−1)-bit conversion unit 520. Furthermore, in the following description, the quantization data of the ADC 340 is an integer of 0 to $2^N-1$.

The first (N−1)-bit conversion unit 510 converts quantization data produced by the ADC 340 into a value that is the same as the quantization data produced by the ADC 340 or an even number value that is 1 less than the quantization data produced by the ADC 340.

The second (N−1)-bit conversion unit 520 converts the quantization data produced by the ADC 340 into a value that is the same as the quantization data produced by the ADC 340 or an odd number value that is 1 less than the quantization data produced by the ADC 340.

Here, the correlation between the N-bit quantization data that is input to the determination unit 410, quantization data obtained after bit conversion by the first (N−1)-bit conversion unit 510, and quantization data obtained after bit conversion by the second (N−1)-bit conversion unit 520 is described with reference to FIG. 3B. In FIG. 3B, N=8, or in other words, the quantization data (0 to 255) produced by the ADC 340 is given according to 8-bit quantization resolution.

For example, in a case where the N (=8)-bit quantization data is an even number value (0, 2, 4, . . . , 254), the first (N−1)-bit conversion unit 510 outputs a value (0, 2, 4, . . . , 254) that is the same as the input quantization data, to the first coherent addition unit 512.

Furthermore, in a case where the N (=8)-bit quantization data is an odd number value (1, 3, 5, . . . , 255), the first (N−1)-bit conversion unit 510 outputs an even number value (0, 2, 4, . . . , 254) that is 1 less than the input quantization data, to the first coherent addition unit 512.

On the other hand, in a case where the N (=8)-bit quantization data is an even number value (0, 2, 4, . . . , 254), the second (N−1)-bit conversion unit 520 outputs an odd number value (−1, 1, 3, . . . , 255) that is 1 less than the input quantization data, to the second coherent addition unit 522.

For example, in a case where the N (=8)-bit quantization data is an odd number value (1, 3, 5, . . . , 255), the second (N−1)-bit conversion unit 520 outputs a value (1, 3, 5, . . . , 255) that is the same as the input quantization data, to the second coherent addition unit 522.

The first coherent addition unit 512 performs coherent addition on the quantization data obtained after bit conversion in the first (N−1)-bit conversion unit 510 for a prescribed number of times (for example, 10,000 times) and outputs to the first normalization unit 514. It should be noted that, although it is preferable for the prescribed number of times that coherent addition is performed in the first coherent addition unit 512 to be the same as the number of times that addition is performed in the coherent addition unit 360, it is sufficient as long as coherent addition is performed in at least one sample point with regard to the coherent addition of a thermal noise signal, and therefore the prescribed number of times that coherent addition is performed in the first coherent addition unit 512 may be less than the number of times that addition is performed in the coherent addition unit 360.

The second coherent addition unit 522 performs coherent addition on the quantization data obtained after bit conversion in the second (N−1)-bit conversion unit 520 for a prescribed number of times (for example, 10,000 times) and outputs to the second normalization unit 524. It should be noted that, although it is preferable for the prescribed number of times that coherent addition is performed in the second coherent addition unit 522 to be the same as the number of times that addition is performed in the coherent addition unit 360, it is sufficient as long as coherent addition is performed in at least one sample point with regard to the coherent addition of a thermal noise signal, and therefore the prescribed number of times that coherent addition is performed in the second coherent addition unit 522 may be less than the number of times that addition is performed in the coherent addition unit 360.

The first normalization unit 514 performs normalization by dividing the coherent addition result of the first coherent addition unit 512 by the number of times that coherent addition is performed (for example, 10,000). The first normalization unit 514 outputs the addition result obtained after normalization of the first coherent addition unit 512 to the comparison unit 530.

The second normalization unit 524 performs normalization by dividing the coherent addition result of the second coherent addition unit 522 by the number of times that coherent addition is performed (for example, 10,000). The second normalization unit 524 outputs the addition result obtained after normalization of the second coherent addition unit 522 to the comparison unit 530.

The comparison unit 530 calculates the difference between the addition results obtained after normalization by the first normalization unit 514 and the second normalization unit 524, and compares the difference between the addition results obtained after normalization and a prescribed threshold value (for example, 0.5). In a case where the difference between the addition outputs obtained after normalization is greater than the prescribed threshold value (see FIG. 6 or FIG. 7), the comparison unit 530 determines that the gain value is unsuitable for the dithering of a thermal noise signal that has been input to the radar device 100, and outputs the determination result to the gain adjustment unit 420.

On the other hand, in a case where the difference between the addition results obtained after normalization by the first normalization unit 514 and the second normalization unit 524 is less than the prescribed threshold value (see FIG. 8), the comparison unit 530 determines that the gain value is suitable for the dithering of the thermal noise signal that has been input to the radar device 100, and outputs the determination result to the gain adjustment unit 420.

Here, the quantization resolution of the ADC 340 of the radar device 100 in the present embodiment is N bits, and therefore the radar device 100 employs the following configuration in order to determine whether a thermal noise signal is suitable in order to quantize an input signal in accordance with (N+1)-bit quantization resolution.

Consequently, the determination unit 410 in the present embodiment virtually has (N−1)-bit quantization resolution, and, in addition, two bit conversion units having different bit conversion methods, specifically the first (N−1)-bit conversion unit 510 and the second (N−1)-bit conversion unit 520, are provided. The determination unit 410 performs coherent addition on the quantization data obtained after bit conversion by the first (N−1)-bit conversion unit 510 and the second (N−1)-bit conversion unit 520, and uses the additionally normalized addition results to determine whether or not N-bit quantization resolution has been obtained with respect to (N−1)-bit quantization data.

To rephrase, in a case where coherent addition is performed on the quantization data obtained after bit conversion by the first (N−1)-bit conversion unit 510 and the second (N−1)-bit conversion unit 520 and the differences of the additionally normalized addition results are approximately the same (for example, less than the prescribed threshold value (for example, 0.5)), the determination unit 410 virtually having (N−1)-bit quantization resolution determines that a signal (data) has been quantized in accordance with N-bit quantization resolution. In other words, the determination unit 410 determines that a gain value for subjecting an input signal to dithering in accordance with (N+1)-bit quantization resolution in the ADC 340 having N-bit quantization resolution is set in the VGA 330.

Figure 4A:
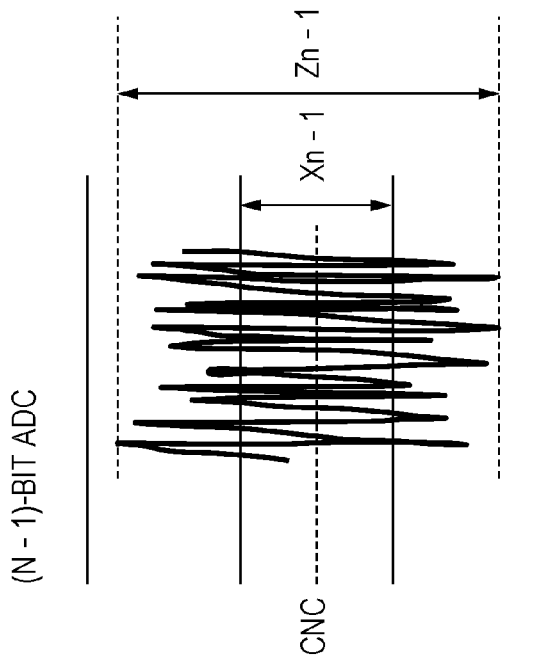
FIG. 4A is a schematic drawing depicting the relationship between the amplitude of 1 LSB in a quantization resolution N-bit ADC and the amplitude of a thermal noise signal required for dithering.
Figure 4B:
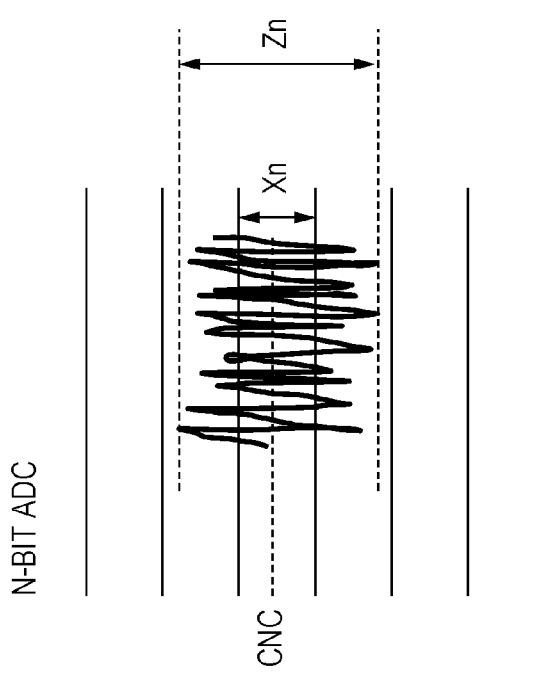
FIG. 4B is a schematic drawing depicting the relationship between the amplitude of 1 LSB in a quantization resolution (N−1)-bit ADC and the amplitude of a thermal noise signal required for dithering.

FIG. 4A is a schematic drawing depicting the relationship between the amplitude Xn of 1 LSB in the quantization resolution N-bit ADC 340 and the amplitude Zn of a thermal noise signal required for dithering. FIG. 4B is a schematic drawing depicting the relationship between the amplitude Xn−1 of 1 LSB in the quantization resolution (N−1)-bit ADC 340 and the amplitude Zn−1 of a thermal noise signal required for dithering. In FIG. 4A and FIG. 4B, the amplitude required for dithering, or in other words, the width of the amplitude Zn or the amplitude Zn−1 obtained after gain adjustment, is depicted for the case where a thermal noise signal that fluctuates centered on a level CNC has been input.

Each graduation interval depicted in FIG. 4A or FIG. 4B indicates 1 LSB (least significant bit) in a quantization resolution N-bit or (N−1)-bit ADC. Accordingly, the range Xn depicted in FIG. 4A indicates the amplitude of 1 LSB in a quantization resolution N-bit ADC, and the range Xn−1 depicted in FIG. 4B indicates the amplitude of 1 LSB in a quantization resolution (N−1)-bit ADC.

Furthermore, in FIG. 4A and FIG. 4B, in the case where a thermal noise signal that fluctuates centered on the level CNC has been input, the amplitudes Zn and Zn−1 required for dithering and the amplitudes Xn and Xn−1 of 1 LSB satisfy equation (1). Here, the amplitude Xn and the amplitude Xn−1 satisfy equation (2), and therefore, according to equation (1) and equation (2), the amplitude Zn and the amplitude Zn−1 satisfy equation (3). In other words, the gain adjustment unit 420 takes equation (3) into consideration, and uses the determination result of the determination unit 410 to adjust the gain value.

$$\frac{Zn}{Xn} = \frac{Zn-1}{Xn-1} \quad (1)$$

$$Xn = 0.5 \times Xn-1 \quad (2)$$

$$Zn = 0.5 \times Zn-1 \quad (3)$$

FIG. 5A is a schematic drawing depicting the amplitude Zn of a thermal noise signal required for dithering, with respect to a thermal noise signal having a level that is in the center of 1 LSB, in the quantization resolution N-bit ADC 340. FIG. 5B is a schematic drawing depicting the amplitude Zn' of a thermal noise signal required for dithering, with respect to a thermal noise signal having a level that is close to the lower bound of 1 LSB, in the quantization resolution N-bit ADC 340.

In FIG. 5A and FIG. 5B, the width of the amplitude Zn or the amplitude Zn' required for dithering is depicted for the case where a thermal noise signal that fluctuates centered on the level CNC has been input. As in FIG. 4A or FIG. 4B, each graduation interval depicted in FIG. 5A or FIG. 5B indicates 1 LSB in a quantization resolution N bit ADC.

In FIG. 5A, the central level CNC of the thermal noise signal is in the center between graduations, and therefore the thermal noise signal fluctuates between a level (level 99) that corresponds to the second graduation from the top of FIG. 5A and a level (level 101) that corresponds to the fourth graduation.

On the other hand, in FIG. 5B, the central level CNC of the thermal noise signal is close to a lower bound rather than the center between graduations, and therefore the thermal noise signal fluctuates between a level (level 99) that corresponds to the second graduation from the top of FIG. 5B and a level (level 102) that corresponds to the fifth graduation.

Therefore, in a case where a thermal noise signal having a central level CNC is input to the ADC 340 having N bit quantization resolution, the gain adjustment unit 420 takes into consideration that the center of the thermal noise signal is in the center between graduations or at the lower bound, and performs adjustment to a gain value corresponding to the amplitude Zn' which is obtained by adding a prescribed amplitude margin to the amplitude Zn depicted in FIG. 5A.

It should be noted that, in the present embodiment, a suitable state is a state in which the input thermal noise signal spans the quantization value that includes the central level CNC and the quantization values that are prior and subsequent thereto ±1. That is, in FIG. 5A, the central level CNC is the quantization value 100, and therefore a suitable state is a state in which the thermal noise signal spans from the quantization value 99 to the quantization value 101.

The central level CNC of the input thermal noise signal, and the amplitude size in order for the amplitude at the top side of the thermal noise signal to cross over into the next quantization value above is described next.

In FIG. 5A, the central level CNC is the central level of a graduation, and therefore, with regard to the central level CNC, it is necessary for Zn/2≥d1 to be satisfied in order for the amplitude Zn/2 at the top side (the quantization value 99 side) of the thermal noise signal to cross over into the next quantization value 99 above. It should be noted that, in FIG. 5A, the central level CNC is positioned in the central portion of the quantization value 100, and therefore d1=Xn/2.

Furthermore, in FIG. 5B, the central level CNC is positioned in the vicinity of the lower bound of a graduation (quantization value 100), and therefore it is necessary for Zn'/2≥d'1 to be satisfied in order for the amplitude Zn'/2 at the top side (99-bit side) of the thermal noise signal to cross over into the next quantization value 99 above.

Here, with the central level CNC being positioned in the vicinity of the lower bound of the quantization value 100, it is considered that d'1=2d1, and therefore Zn/2=d1, Zn'/2=d'1, d'1=2d1, and, in accordance with equation (3), Zn'=2Zn=2×(Zn−1)/2, or in other words, adjustment is performed to a gain value corresponding to the amplitude Zn−1 (see equation (4)).

$$Zn'=Zn-1 \quad (4)$$

FIG. 6 is an illustrative drawing depicting an example of quantization data obtained after bit conversion by the first (N−1)-bit conversion unit 510 and the second (N−1)-bit conversion unit 520 with respect to a low-level thermal noise signal, and a result regarding the suitability of a gain value used for dithering. In FIG. 6, the level of the thermal noise signal is low, and the central level CNC of the thermal noise signal is in the center of graduation 100 in N-bit quantization resolution.

The quantization data of the input thermal noise signal is 100, and therefore, in accordance with FIG. 3B, the quantization data obtained after bit conversion by the first (N−1)-bit conversion unit 510 becomes 100. Accordingly, in the upper stage of FIG. 6, in the case where the number of times that coherent addition is performed is 10, the addition result obtained after normalization by the first normalization unit 514 is (100+100+100+100+100+100+100+100+100+100)/10=100.

Likewise, the quantization data of the input thermal noise signal is 100, and therefore, in accordance with FIG. 3B, the quantization data obtained after bit conversion by the second (N−1)-bit conversion unit 520 is 99. Accordingly, in the lower stage of FIG. 6, in the case where the number of times that coherent addition is performed is 10, the addition result obtained after normalization by the second normalization unit 524 is (99+99+99+99+99+99+99+99+99+99)/10=99.

Accordingly, the absolute value (=1) of the difference between the addition result obtained after normalization by the first normalization unit 514 and the addition result obtained after normalization by the second normalization unit 524 is greater than the prescribed threshold value (=0.5), and therefore the comparison unit 530 determines that the gain value is unsuitable for the dithering of the thermal noise signal that has been input to the radar device 100, and outputs the determination result to the gain adjustment unit 420. In other words, the comparison unit 530 determines that a gain value for quantizing the thermal noise signal in accordance with (N+1)-bit quantization resolution is not set in the VGA 330.

FIG. 7 is an illustrative drawing depicting an example of quantization data obtained after bit conversion by the first (N−1)-bit conversion unit 510 and the second (N−1)-bit conversion unit 520 with respect to a thermal noise signal the level of which has a small fluctuation range, and a result regarding the suitability of the gain value used for dithering. In FIG. 7, the fluctuation range of the level of the thermal noise signal is small, and in the thermal noise signal, the central level CNC fluctuates from graduation 99 to 101, centered on graduation 100 in N-bit quantization resolution.

As the central level CNC of the quantization data of the input thermal noise signal is 100, in accordance with FIG. 3B, the quantization data obtained after bit conversion by the first (N−1)-bit conversion unit 510 becomes 100 or 102. Accordingly, in the upper stage of FIG. 7, when the number of times that coherent addition is performed is 10, the addition result obtained after normalization by the first normalization unit 514 becomes (100+100+102+100+100+100+100+100+100+100)/10=100.2.

Likewise, as the central level CNC of the quantization data of the input thermal noise signal is 100, in accordance with FIG. 3B, the quantization data obtained after bit conversion by the second (N−1)-bit conversion unit 520 becomes 99 or 101. Accordingly, in the lower stage of FIG. 7, when the number of times that coherent addition is performed is 10, the addition result obtained after normalization by the second normalization unit 524 becomes (101+99+101+101+101+101+101+101+101+101)/10=100.8.

Accordingly, the absolute value (=0.6) of the difference between the addition result obtained after normalization by the first normalization unit 514 and the addition result obtained after normalization by the second normalization unit 524 is greater than the prescribed threshold value (=0.5), and therefore the comparison unit 530 determines that the gain value is unsuitable for the dithering of the thermal noise signal that has been input to the radar device 100, and outputs the determination result to the gain adjustment unit 420. In other words, the comparison unit 530 determines that a gain value for quantizing the thermal noise signal in accordance with (N+1)-bit quantization resolution is not set in the VGA 330.

FIG. 8 is an illustrative drawing depicting an example of quantization data obtained after bit conversion by the first (N−1)-bit conversion unit 510 and the second (N−1)-bit conversion unit 520 with respect to a thermal noise signal the level of which has a large fluctuation range, and a result regarding the suitability of the gain value used for dithering. In FIG. 8, the fluctuation range of the level of the thermal noise signal is sufficiently large, and in the thermal noise signal, the central level CNC fluctuates from graduation 99 to 102, centered on graduation 100 in N-bit quantization resolution.

As the central level CNC of the quantization data of the input thermal noise signal is 100, in accordance with FIG. 3B, the quantization data obtained after bit conversion by the first (N−1)-bit conversion unit 510 becomes 100 or 102. Accordingly, in the upper stage of FIG. 8, when the number of times that coherent addition is performed is 10, the addition result obtained after normalization by the first normalization unit 514 is (100+100+102+100+102+100+102+100+102+100)/10=100.8.

Likewise, as the central level CNC of the quantization data of the input thermal noise signal is 100, in accordance with FIG. 3B, the quantization data obtained after bit conversion by the second (N−1)-bit conversion unit 520 becomes 99 or 101. Accordingly, in the lower stage of FIG. 8, when the number of times that coherent addition is performed is 10, the addition result obtained after normalization by the second normalization unit 524 is (101+99+101+101+101+101+101+99+101+101)/10=100.6.

Accordingly, the absolute value (=0.2) of the difference between the addition result obtained after normalization by the first normalization unit 514 and the addition result obtained after normalization by the second normalization unit 524 is less than the prescribed threshold value (=0.5), and therefore the comparison unit 530 determines that the gain value is suitable for the dithering of the thermal noise signal that has been input to the radar device 100, and outputs the determination result to the gain adjustment unit 420. In other words, the comparison unit 530 determines that a gain value for quantizing the thermal noise signal in accordance with (N+1)-bit quantization resolution is set in the VGA 330.

Figure 9:
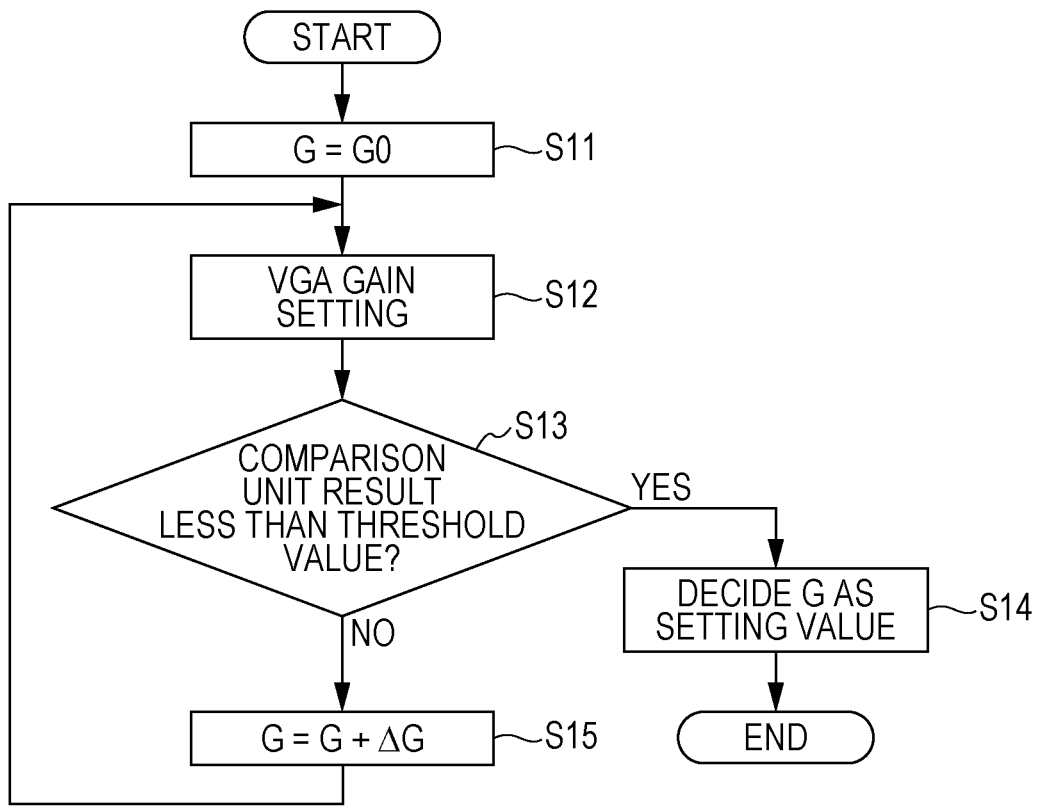
FIG. 9 is a flowchart illustrating the operational procedure of a gain adjustment unit of the radar device of the first embodiment.

Next, the operational procedure of the gain adjustment unit 420 in the radar device 100 of the present embodiment is described with reference to FIG. 9. FIG. 9 is a flowchart illustrating the operational procedure of the gain adjustment unit 420 of the radar device 100 of the first embodiment. It should be noted that, in the flowchart depicted in FIG. 9, a description is given with regard to the procedure performed after the transmission unit TX has stopped the transmission of the radar transmission signal LTX in accordance with a control signal output by the control unit CNT.

In FIG. 9, the gain adjustment unit 420 sets a prescribed value (for example, the initial value G0) in the VGA 330 as a gain value G for the VGA 330 of the radar device 100 (S11, S12). It should be noted that, in the present embodiment, with regard to the gain value for dithering an input signal of the ADC 340, it is preferable that a gain value that corresponds to the lower bound (L2) of the level of the thermal noise signal is set (see FIG. 1), and therefore the initial value of the gain value G is the smallest value of the gain values set by the gain adjustment unit 420.

The gain adjustment unit 420 determines the suitability of the gain value of the VGA 330 set in step S12, as a gain value used for the dithering of the thermal noise signal that has been input to the radar device 100, on the basis of the determination result of the determination unit 410 (S13).

Specifically, as the determination result output by the determination unit 410, in a case where it is determined that the difference between the addition result obtained after normalization by the first normalization unit 514 and the addition result obtained after normalization by the second normalization unit 524 is less than the prescribed threshold value (for example, 0.5) (S13: YES), the gain adjustment unit 420 decides that the gain value G set in step S12 is to be used (S14). After step S14, the operation of the gain adjustment unit 420 depicted in FIG. 9 ends.

It should be noted that the gain adjustment unit 420 may take equation (3) into consideration (see FIG. 4A and FIG. 4B) and use the value of half of the gain value G set in step S12, as a gain value, and may take equation (4) into consideration (see FIG. 5A and FIG. 5B) and use the gain value G set in step S12, as a gain value corresponding to an amplitude that includes the margin depicted in FIG. 5B.

On the other hand, as the determination result output by the determination unit 410, in a case where it is determined that the difference between the addition result obtained after normalization by the first normalization unit 514 and the addition result obtained after normalization by the second normalization unit 524 is equal to or greater than the prescribed threshold value (for example, 0.5) (S13: NO), the gain adjustment unit 420 adds the prescribed gain increase value ΔG to the gain value G set in step S12 (S15: G=G+ΔG).

The gain adjustment unit 420 repeats the processing of step S12, step S13, and step S15 until it is determined on the basis of the determination result of the determination unit 410 that the gain value G (=G+ΔG) obtained after the addition in step S15 is a gain value that is suitable for the dithering of the thermal noise signal that has been input to the radar device 100.

As described above, the radar device 100 of the present embodiment uses the quantization data of the thermal noise signal in the determination unit 410 to determine suitability as a gain value used for the dithering of the input thermal noise signal while the transmission of the radar transmission signal LTX is stopped, and perform adjustment to a gain value for quantizing, with high-resolution, an input signal of the ADC 340 by dithering, in accordance with the determination result in the determination unit 410.

Thus, in the radar device 100, the gain value of the VGA 330 does not fluctuate when there are no surrounding temperature fluctuations, and therefore the fluctuation range of the input thermal noise signal is small while the transmission of the radar transmission signal LTX is stopped, and the thermal noise signal can be subjected to dithering in accordance with the gain value set in the VGA 330.

Furthermore, in the radar device 100, although the gain value of the VGA 330 fluctuates when there are surrounding temperature fluctuations, the fluctuation range of the input thermal noise signal also becomes larger while the transmission of the radar transmission signal LTX is stopped, and therefore, by setting, in the VGA 330, a gain value with which the difference between the addition result obtained after normalization by the first normalization unit 514 and the addition result obtained after normalization by the second normalization unit 524 in the determination unit 410 becomes less than the prescribed threshold value, the thermal noise signal input to the ADC 340 can be subjected to dithering with high resolution.

In other words, even though there are surrounding temperature fluctuations, the radar device 100 is able to adjust the gain value for quantizing the input value of the ADC 340 with high-resolution by dithering.

Furthermore, in the determination unit 410, coherent addition is performed on quantization data obtained after bit conversion by the first (N−1)-bit conversion unit 510 and quantization data obtained after bit conversion by the second (N−1)-bit conversion unit 520, for the same number of times that coherent addition is performed by the coherent addition unit 360 of the reception unit RX, and therefore the radar device 100 is able to perform adjustment to, as the gain value of the VGA 330, a gain value that is more suitable for performing dithering with high resolution on the thermal noise signal input to the ADC 340, than a gain value determined empirically, for example.

Furthermore, by omitting the addition of a circuit component (for example, a noise generator) that applies an external signal as a reference in the aforementioned Japanese Unexamined Patent Application Publication No. 2005-77137, and providing the determination unit 410, the radar device 100 is able to perform adjustment to, as the gain value of the VGA 330, a gain value that is suitable for performing dithering with high resolution on the thermal noise signal input to the ADC 340, with a simple circuit configuration.

It should be noted that, in FIG. 1, in the case where the desired level range RSL of a reception signal in the radar device 100 is larger than the dynamic range DRG of the ADC 340, it becomes difficult to receive a signal that exceeds the dynamic range DRG of the ADC 340 in one go. Therefore, the radar device 100 divides the desired level range RSL for a reception signal in the radar device 100 depicted in FIG. 1 into a plurality of level ranges (for example, two), and, in addition, sets the divided signal level ranges in a temporally alternating manner to separately receive signals of a level within the dynamic range DRG of the ADC 340.

The radar device 100 uses a suitable gain value that corresponds to the divided signal level ranges, in accordance with the number of divided level ranges of the desired level range RSL for the reception signal in the radar device 100.

For example, the radar device 100 receives a thermal noise signal in a "low" level range, and uses suitable gain values that are set using the method of the present embodiment, as gain values that correspond to the divided signal level ranges.

Furthermore, the radar device 100 is able to set a gain value for the VGA 330 by adding a prescribed offset value to a suitable gain value that is set corresponding to a thermal noise signal that has been input in a "high" level range.

It should be noted that, in the aforementioned present embodiment, the determination unit 410 determines the suitability of the gain value used for the dithering of the thermal noise signal input to the ADC 340, by using the comparison result between the difference between the addition result obtained after normalization by the first normalization unit 514 and the addition result obtained after normalization by the second normalization unit 524 and a prescribed threshold value.

Furthermore, the determination unit 410 may determine the suitability of the gain value used for the dithering of the thermal noise signal input to the ADC 340, in accordance with whether or not a rounding result for the addition result obtained after normalization by the first normalization unit 514 and a rounding result for the addition result obtained after normalization by the second normalization unit 524 are the same.

For example, in the first example, the addition result obtained after normalization by the first normalization unit 514 is 100, and the addition result obtained after normalization by the second normalization unit 524 is 101. Since the rounding result (100) for the addition result obtained after normalization by the first normalization unit 514 and the rounding result (101) for the addition result obtained after normalization by the second normalization unit 524 do not coincide, the determination unit 410 determines that the gain value is unsuitable for the dithering of the thermal noise signal input to the ADC 340.

For example, in the second example, the addition result obtained after normalization by the first normalization unit 514 is 100.2, and the addition result obtained after normalization by the second normalization unit 524 is 100.8. Since the rounding result (100) for the addition result obtained after normalization by the first normalization unit 514 and the rounding result (101) for the addition result obtained after normalization by the second normalization unit 524 do not coincide, the determination unit 410 determines that the gain value is unsuitable for the dithering of the thermal noise signal input to the ADC 340.

For example, in the third example, the addition result obtained after normalization by the first normalization unit 514 is 100.8, and the addition result obtained after normalization by the second normalization unit 524 is 100.6. Since the rounding result (101) for the addition result obtained after normalization by the first normalization unit 514 and the rounding result (101) for the addition result obtained after normalization by the second normalization unit 524 do coincide, the determination unit 410 determines that the gain value is suitable for the dithering of the thermal noise signal input to the ADC 340.

Furthermore, in the aforementioned present embodiment, in FIG. 3B, although the conversion output of the second (N−1)-bit conversion unit 520 is −1 when the quantization data of an input thermal noise signal is 0, the second (N−1)-bit conversion unit 520 may perform clipping with respect to the input quantization data and output 0.

Second Embodiment

A radar device 100a of the second embodiment is different from the radar device 100 of the first embodiment in terms of the configuration and operation of the determination unit. Therefore, in the present embodiment, when describing the configuration and operation of the radar device 100a and the radar device 100, descriptions of the same content are simplified or omitted and differences are described. For example, the configuration and operation of a determination unit 410a are described with respect to the differences with the configuration and operation of the determination unit 410.

(Determination Unit of the Second Embodiment)

Figure 10:
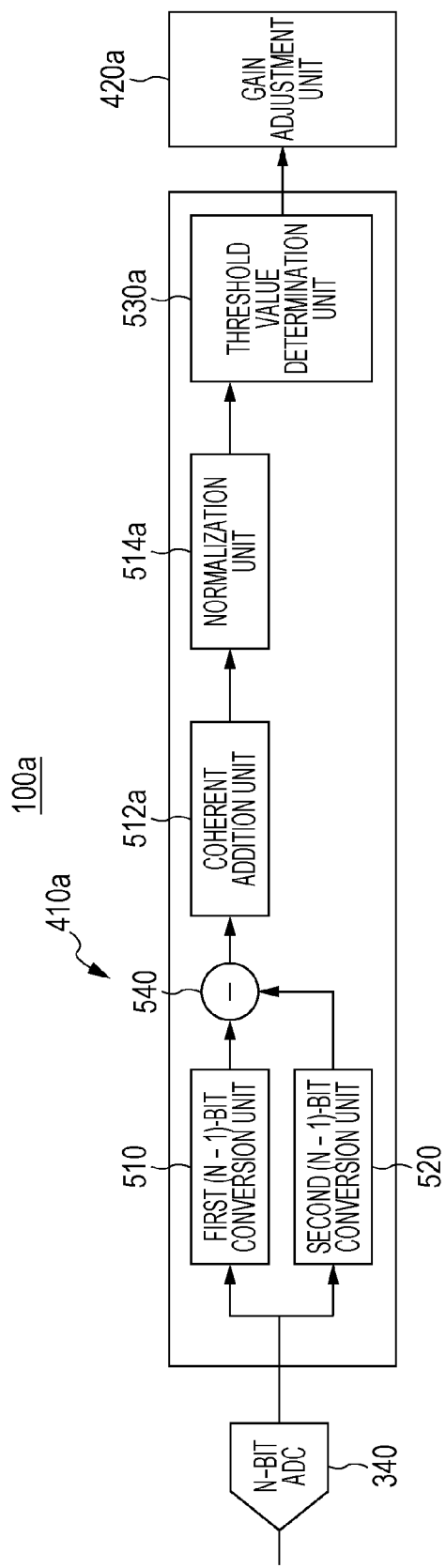
FIG. 10 is a block diagram depicting the internal configuration of a determination unit of a radar device of a second embodiment.

FIG. 10 is a block diagram depicting the internal configuration of the determination unit 410a of the radar device 110a of the second embodiment. The determination unit 410a depicted in FIG. 10 has the first (N−1)-bit conversion unit 510, the second (N−1)-bit conversion unit 520, a subtractor 540, a coherent addition unit 512a, a normalization unit 514a, and a threshold value determination unit 530a.

Bit conversion output of the first (N−1)-bit conversion unit 510 and bit conversion output of the second (N−1)-bit conversion unit 520 are input to the subtractor 540. The subtractor 540 subtracts the bit conversion output of the second (N−1)-bit conversion unit 520 from the bit conversion output of the first (N−1)-bit conversion unit 510, and outputs the subtraction result (difference) to the coherent addition unit 512a.

The coherent addition unit 512a performs coherent addition on the difference between the bit conversion output of the first (N−1)-bit conversion unit 510 and the bit conversion output of the second (N−1)-bit conversion unit 520 for a prescribed number of times (for example, 10,000 times) and outputs to the normalization unit 514a. It should be noted that it is preferable for the prescribed number of times that coherent addition is performed in the coherent addition unit 512a to be the same as the number of times that addition is performed in the coherent addition unit 360. However, with regard to the coherent addition of a thermal noise signal, it is sufficient as long as coherent addition is performed in at least one sample point, and therefore the prescribed number of times that coherent addition is performed in the coherent addition unit 512a may be less than the number of times that addition is performed in the coherent addition unit 360.

The normalization unit 514a performs normalization by dividing the coherent addition result of the coherent addition unit 512a by the number of times that coherent addition is performed (for example, 10,000). The normalization unit 514a outputs the addition result obtained after normalization, to the threshold value determination unit 530a.

The threshold value determination unit 530a compares the addition result obtained after normalization by the normalization unit 514a and a prescribed threshold value (for example, 0.5). In a case where the addition result obtained after normalization by the normalization unit 514a is greater than the prescribed threshold value (see FIG. 6 or FIG. 7), the threshold value determination unit 530a determines that the gain value is unsuitable for the dithering of the thermal noise signal input to the radar device 100a, and outputs the determination result to a gain adjustment unit 420a.

On the other hand, in a case where the addition result obtained after normalization by the normalization unit 514a is less than the prescribed threshold value (see FIG. 8), the threshold value determination unit 530a determines that the gain value is suitable for the dithering of the thermal noise signal input to the radar device 100a, and outputs the determination result to the gain adjustment unit 420a. It should be noted that the operation of the gain adjustment unit 420a is the same as that of the gain adjustment unit 420 of the radar device 100 of the first embodiment, and therefore the description thereof is omitted (see FIG. 9).

As described above, the radar device 100a of the present embodiment obtains the same effect as that of the radar device 100 of the first embodiment and, in addition, the circuit scale of the radar device 100a is able to be reduced compared to the circuit scale of the radar device 100.

For example, in the first embodiment, there are two coherent addition units in the determination unit 410, and in the case where (N−1)-bit data is to be subjected to coherent addition C times (C being an integer of one or more, and $C=2^N$) in each coherent addition unit, as the circuit scale of the coherent addition units, a buffer of at least (N−1)×C bits is required.

On the other hand, in the present embodiment, since the difference between the quantization data obtained after bit conversion by the first (N−1)-bit conversion unit 510 and the quantization data obtained after bit conversion by the second (N−1)-bit conversion unit 520 is used in the subtractor 540 of the determination unit 410a, the level of the thermal noise signal becomes a subtraction value. For example, in a case where a thermal noise signal serving as the subtraction value is 4 bits, it is sufficient as long as there is a corresponding buffer in which coherent addition is performed with respect to the 4-bit thermal noise signal C times.

For example, when N=8 and $C=256$ ($=2^8$), two (8−1)+8−15 bit buffers are required in the determination unit 410 of the first embodiment; however, one 4+8=12 bit buffer is sufficient in the determination unit 410a of the present embodiment. In other words, in the determination unit 410a of the present embodiment, the number of buffers required for the coherent addition unit can be reduced, and, in addition, the number of bits of the adder in the coherent addition unit can be decreased, and therefore the circuit scale of the radar device 100a can be reduced compared to the circuit scale of the radar device 100.

Furthermore, the comparison unit 530 of the determination unit 410 in the first embodiment calculates the difference between the addition result obtained after normalization by the first normalization unit 514 and the addition result obtained after normalization by the second normalization unit 524. Therefore, a 15-bit subtractor is used in the comparison unit 530. In contrast to this, an 8-bit subtractor can be used for the subtractor 540 of the determination unit 410a of the present embodiment. Accordingly, from the viewpoint of the circuit scale of the subtractor, the circuit scale of the radar device 100a of the present embodiment can be reduced compared to that of the radar device 100 of the first embodiment.

Third Embodiment

A radar device 100b of the third embodiment is different from the radar device 100a of the second embodiment in terms of the configuration and operation of the determination unit. Therefore, in the present embodiment, when describing the configuration and operation of the radar device 100b and the radar device 100a, descriptions of the same content are simplified or omitted, and content that is different is described. For example, the configuration and operation of a determination unit 410b are described with regard to the differences with the configuration and operation of the determination unit 410a.

(Determination Unit of the Third Embodiment)

Figures 11A, 11B:
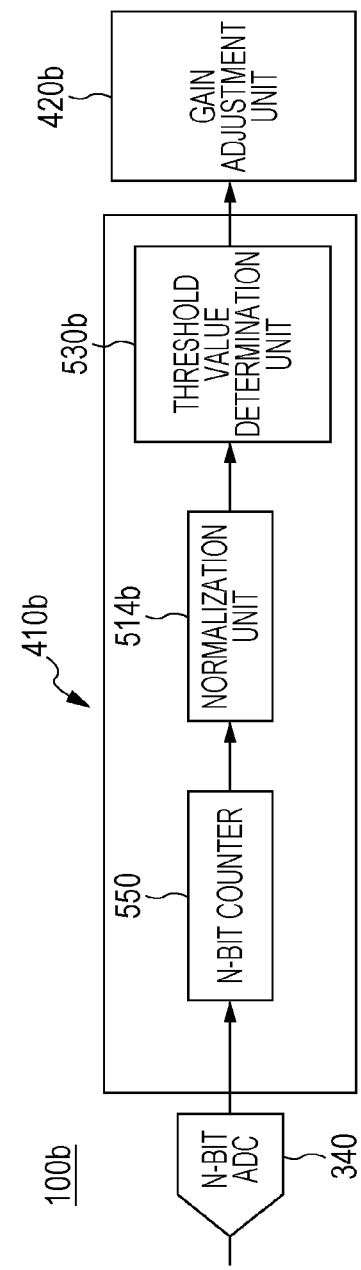
FIG. 11A is a drawing depicting the correlation between N-bit quantization data that is input, quantization data obtained after bit conversion by a first (N−1)-bit conversion unit, quantization data obtained after bit conversion by a second (N−1)-bit conversion unit, and the difference between the quantization data obtained after bit conversion by the first (N−1)-bit conversion unit and the quantization data obtained after bit conversion by the second (N−1)-bit conversion unit.
FIG. 11B is a block diagram depicting the internal configuration of a determination unit of a radar device of a third embodiment.

FIG. 11A is a drawing depicting the correlation between N-bit quantization data that is input, quantization data obtained after bit conversion by the first (N−1)-bit conversion unit 510, quantization data obtained after bit conversion by the second (N−1)-bit conversion unit 520, and the difference between the quantization data obtained after bit conversion by the first (N−1)-bit conversion unit 510 and the quantization data obtained after bit conversion by the second (N−1)-bit conversion unit 520. FIG. 11B is a block diagram depicting the internal configuration of the determination unit 410b of the radar device 100b of the third embodiment. The determination unit 410b depicted in FIG. 11B has an N-bit counter 550, a normalization unit 514b, and a threshold value determination unit 530b.

In FIG. 11A, quantization data obtained after bit conversion by the first (N−1)-bit conversion unit 510, quantization data obtained after bit conversion by the second (N−1)-bit conversion unit 520, and the difference between the quantization data obtained after bit conversion by the first (N−1)-bit conversion unit 510 and the quantization data obtained after bit conversion by the second (N−1)-bit conversion unit 520 is depicted with respect to data (0 to 255) quantized in the ADC 340 in accordance with N=8, or in other words, 8-bit quantization resolution, depicted in FIG. 3B.

For example, in a case where the N (=8)-bit quantization data is an even number value (0, 2, 4, . . . , 254), the difference between the quantization data obtained after bit conversion by the first (N−1)-bit conversion unit 510 and the quantization data obtained after bit conversion by the second (N−1)-bit conversion unit 520 is "+1". In a case where the N (=8)-bit quantization data is an odd number value (1, 3, 5, . . . , 255), the difference between the quantization data obtained after bit conversion by the first (N−1)-bit conversion unit 510 and the quantization data obtained after bit conversion by the second (N−1)-bit conversion unit 520 is "−1".

Accordingly, in the case where the $N^{th}$ bit from the top of the N (=8)-bit quantization data, namely the least significant bit, is "+1", the difference between the quantization data obtained after bit conversion by the first (N−1)-bit conversion unit 510 and the quantization data obtained after bit conversion by the second (N−1)-bit conversion unit 520 becomes "−1", and in the case where the least significant bit is "0", the difference between the quantization data obtained after bit conversion by the first (N−1)-bit conversion unit 510 and the quantization data obtained after bit conversion by the second (N−1)-bit conversion unit 520 becomes "+1".

The N-bit counter 550 counts the number of times that there is "+1" or "0" for the $N^{th}$ bit from the top, namely the least significant bit, with respect to input quantization data. The N-bit counter 550, for example, performs counting for the same number of times as the number of times (C times) that coherent addition is performed by the coherent addition unit 360 in the radar device 100b. Furthermore, for the number of times that coherent addition is performed, which is C times, the N-bit counter 550 may count the number of times that the least significant bit of input quantization data is either "+1" or "0".

For example, with C=100 times, the N-bit counter 550 counts that the least significant bit of input quantization data is "+1" 53 times and "0" 47 times. In correspondence with the least significant bit being "+1", the N-bit counter 550 calculates "−1"×53=−53 as the total value of the difference between the quantization data obtained after bit conversion by the first (N−1)-bit conversion unit 510 and the quantization data obtained after bit conversion by the second (N−1)-bit conversion unit 520. Likewise, with respect to the least significant bit being "0", the N-bit counter 550 calculates "+1"×47=47 as the total value of the difference between the quantization data obtained after bit conversion by the first (N−1)-bit conversion unit 510 and the quantization data obtained after bit conversion by the second (N−1)-bit conversion unit 520.

In addition, the N-bit counter 550 outputs "−53+47"=−6 to the normalization unit 514b as a counter result for the least significant bit over a total of C (=100) times. In other words, the N-bit counter 550 operates in the same way as the first (N−1)-bit conversion unit 510, the second (N−1)-bit conversion unit 520, and the subtractor 540 of the determination unit 410a of the radar device 100a in the second embodiment.

It should be noted that, in the case where the N-bit counter 550 counts the number of times that the least significant bit of input quantization data is either "+1" or "0" (for example, "+1"), when "+1" is taken as NH, {−NH+(C−NH)}={−53+(100−47)}=−6 is output to the normalization unit 514b.

The operation of the normalization unit 514b and the threshold value determination unit 530b are the same as the operation of the normalization unit 514a and the threshold value determination unit 530a of the determination unit 410a of the radar device 100a in the second embodiment, and therefore a description of the operation of the normalization unit 514b and the threshold value determination unit 530b is omitted.

As described above, the radar device 100b of the present embodiment obtains the same effect as that of the radar device 100 of the first embodiment, and, in addition, is able to be reduced in scale compared to the circuit scale of the radar device 100a of the second embodiment.

It should be noted that, in the case where a gain value determination based on the least significant bit is unsuitable and a gain value determination based on the second least significant bit is suitable, a gain adjustment unit 420b may set the upper bound of the offset value as an arbitrary value of +6 dB or less.

Furthermore, in the case where a gain value determination based on the least significant bit or the second least significant bit is unsuitable and a gain value determination based on the third least significant bit is suitable, the gain adjustment unit 420b may set the upper bound of the offset value as an arbitrary value of +12 dB or less.

Fourth Embodiment

In the first embodiment, the determination unit 410 determined the suitability of a gain value used for the dithering of a thermal noise signal input to the ADC 340, in accordance with the gain value set in the VGA 330, in a state in which the radar device 100 has stopped the transmission of the radar transmission signal LTX and the reflected wave signal RRX is not being received. However, when the level of the thermal noise signal is too large, the coherent addition result in the determination unit 410 is unstable and fluctuates.

In the fourth embodiment, a determination unit 410c determines the suitability of the gain value used for the dithering of the thermal noise signal input to the ADC 340, in accordance with the gain value set in the VGA 330, in the same state as in the first embodiment, and, in addition, determines whether or not the level of the thermal noise signal input to the ADC 340 is excessive.

A radar device 100c of the fourth embodiment is different from the radar device 100 of the first embodiment in terms of the configuration and operation of the determination unit and the operation of the gain adjustment unit. Therefore, in the present embodiment, when describing the configuration and operation of the radar device 100c and the radar device 100, descriptions of the same content are simplified or omitted and differences are described. For example, the configuration and operation of the determination unit 410c are described with respect to differences with the configuration and operation of the determination unit 410, and the operation of a gain adjustment unit 420c is described with respect to differences with the operation of the gain adjustment unit 420.

(Determination Unit of the Fourth Embodiment)

Figure 12:
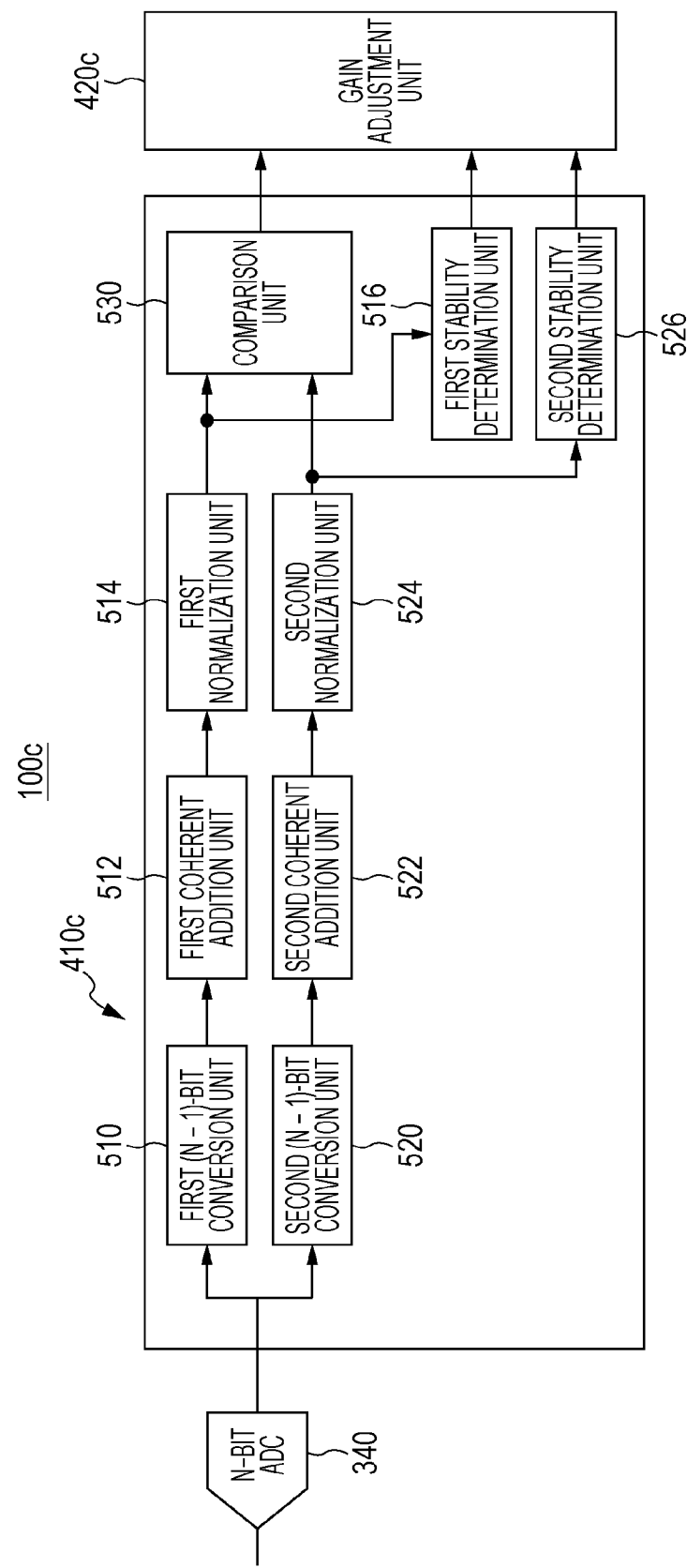
FIG. 12 is a block diagram depicting the internal configuration of a determination unit of a radar device of a fourth embodiment.

FIG. 12 is a block diagram depicting the internal configuration of the determination unit 410c of the radar device 100c of the fourth embodiment. The determination unit 410c depicted in FIG. 12 has the first (N−1)-bit conversion unit 510, the second (N−1)-bit conversion unit 520, the first coherent addition unit 512, the second coherent addition unit 522, the first normalization unit 514, the second normalization unit 524, the comparison unit 530, a first stability determination unit 516, and a second stability determination unit 526.

The first stability determination unit 516 acquires, P times, an addition result obtained after normalization by the first normalization unit 514, or in other words, a value obtained after the coherent addition result for the number of times C that coherent addition is performed in the first coherent addition unit 512 has been normalized. The first stability determination unit 516 analyzes variation in the P number of addition results obtained after normalization by the first normalization unit 514, and determines whether or not the P number of addition results obtained after normalization by the first normalization unit 514 are all equal to or less than a prescribed reference value (stability determination threshold value).

For example, the P (=10) number of addition results obtained after normalization by the first normalization unit 514 are {100.1, 100.3, 99.9, 100.0, 100.3, 100.1, 99.9, 99.8, 100.1, 99.9}, and fluctuate centered on 100. Here, in the case where the prescribed stability determination threshold value is 0.5, the first stability determination unit 516 determines whether or not all of the P (=10) number of addition results obtained after normalization by the first normalization unit 514 are included in a range from "100−0.5=99.5" to "100+0.5=100.5".

In a case where all of the P (=10) number of addition results obtained after normalization by the first normalization unit 514 are included in the range from "100−0.5=99.5" to "100+0.5=100.5", the first stability determination unit 516 determines that the level of the thermal noise signal input to the ADC 340 is stable, and that the level is not excessive.

On the other hand, in a case where not all of the P (=10) number of addition results obtained after normalization by the first normalization unit 514 are included in the range from "100−0.5=99.5" to "100+0.5=100.5", and "100.5" is exceeded, the first stability determination unit 516 determines that the level of the thermal noise signal input to the ADC 340 is unstable, and that the level is excessive.

The second stability determination unit 526 acquires, P times, an addition result obtained after normalization by the second normalization unit 524, or in other words, a value obtained after the coherent addition result for the number of times C that coherent addition is performed in the second coherent addition unit 522 has been normalized. The second stability determination unit 526 analyzes variation in the P number of addition results obtained after normalization by the second normalization unit 524, and determines whether or not the P number of addition results obtained after normalization by the second normalization unit 524 are all equal to or less than the prescribed reference value (stability determination threshold value). An example of the determination made in the second stability determination unit 526 is the same as that for the first stability determination unit 516, and therefore a description thereof is omitted.

Figure 13:
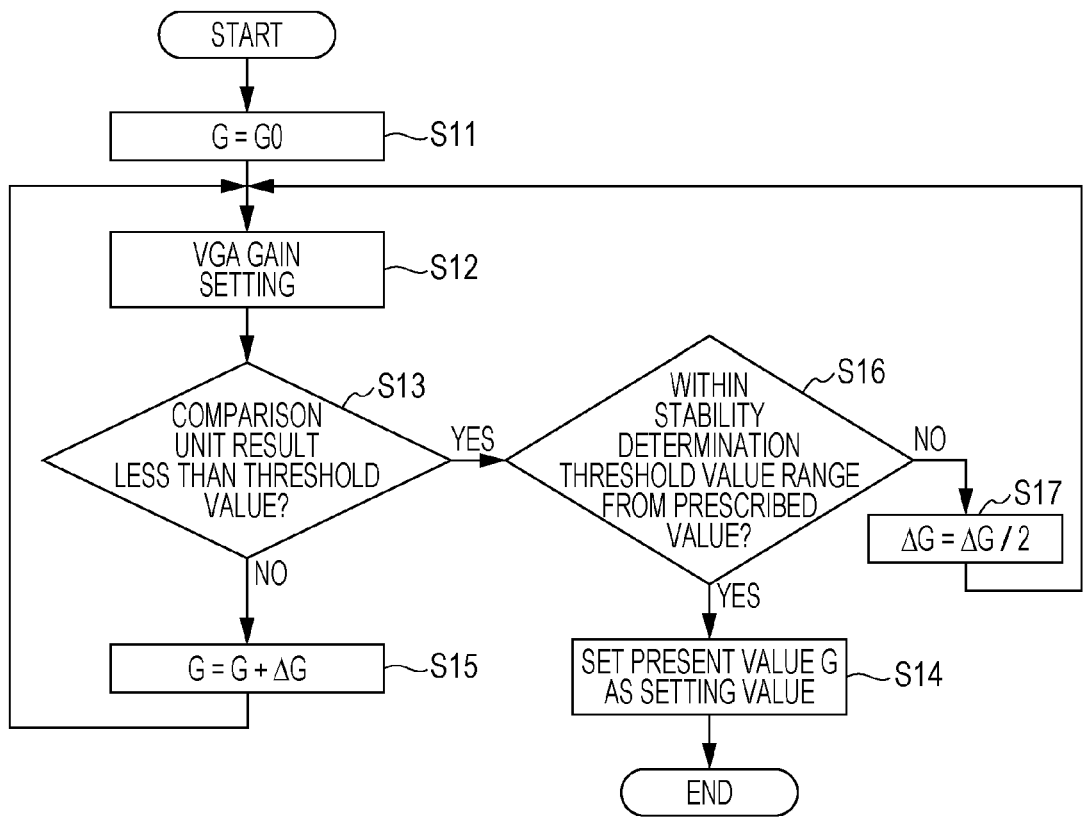
FIG. 13 is a flowchart illustrating the operational procedure of a gain adjustment unit of the radar device of the fourth embodiment.

Next, the operational procedure of the gain adjustment unit 420c in the radar device 100c of the present embodiment is described with reference to FIG. 13. FIG. 13 is a flowchart illustrating the operational procedure of the gain adjustment unit 420c of the radar device 100c of the fourth embodiment. It should be noted that, in the flowchart depicted in FIG. 13, a description is given with regard to the procedure performed after the transmission unit TX has stopped the transmission of the radar transmission signal LTX in accordance with a control signal output by the control unit CNT. It should be noted that, in the description of the flowchart depicted in FIG. 13, descriptions regarding content that is the same as the description of the flowchart depicted in FIG. 9 are omitted or simplified, and differences are described.

In FIG. 13, the gain adjustment unit 420c determines whether, as a determination result output by the comparison unit 530 of the determination unit 410c, the difference between the addition result obtained after normalization by the first normalization unit 514 and the addition result obtained after normalization by the second normalization unit 524 is less than a prescribed threshold value (for example, 0.5) (S13: YES).

In addition, the gain adjustment unit 420c determines whether or not the level of the thermal noise signal input to the radar device 100 is excessive, on the basis of the determination results of at least either or both of the first stability determination unit 516 and the second stability determination unit 526 (S16).

Specifically, the gain adjustment unit 420c determines whether or not all of the P number of addition results obtained after normalization by the first normalization unit 514 or the second normalization unit 524, or all of the P number of addition results obtained after normalization by the first normalization unit 514 and the second normalization unit 524 are centered on a prescribed value and included within the prescribed stability determination threshold value.

In a case where all of the P number of addition results obtained after normalization by the first normalization unit 514 or the second normalization unit 524, or all of the P number of addition results obtained after normalization by the first normalization unit 514 and the second normalization unit 524 are centered on the prescribed value and included within the prescribed stability determination threshold value (S16: YES), the level of the thermal noise signal input to the radar device 100 is not excessive, and the gain adjustment unit 420c sets the value set in step S12 as the gain value G (S14).

On the other hand, in a case where not all of the P number of addition results obtained after normalization by the first normalization unit 514 or the second normalization unit 524, or not all of the P number of addition results obtained after normalization by the first normalization unit 514 and the second normalization unit 524 are centered on the prescribed value and included within the prescribed stability determination threshold value (S16: NO), and the addition results of the prescribed value and the stability determination threshold value are exceeded, the level of the thermal noise signal input to the radar device 100 is excessive, and therefore the gain adjustment unit 420c alters the gain increase value $\Delta G$ that is added in step S14, to a half value ($\Delta G/2$), and sets the gain value (for example, $G=G+\Delta G/2$) of the VGA 330 (S17).

As described above, the radar device 100c of the present embodiment can determine the suitability of the gain value used for the dithering of the thermal noise signal input to the ADC 340, in accordance with the gain value set in the VGA 330, in a state in which the radar device 100c has stopped the transmission of the radar transmission signal LTX and the reflected wave signal RRX is not being received, and, in addition, can determine whether the level of the thermal noise signal input to the ADC 340 is excessive, or in other words, can determine the stability of the thermal noise signal level.

Thus, the radar device 100c obtains the same effect as that of the radar device 100 of the first embodiment, and, in addition, can reduce the number of times that attempts are made to obtain the gain value set in the VGA 330 (for example, the number of times that the processing of step S13 to step S17 depicted in FIG. 13 is carried out).

It should be noted that, in order to determine the stability of the thermal noise signal level, the number of times that coherent addition is performed by the first coherent addition unit 512 input to the first normalization unit 514, and the number of times that coherent addition is performed by the second coherent addition unit 522 input to the second normalization unit 524 may be values that are the same as the number of times that coherent addition is performed in the coherent addition unit 360 of the radar device 100c or may be less than the number of times that coherent addition is performed.

Fifth Embodiment

In the first to fourth embodiments, in order to describe the operation in a situation where there is no other radar device in the periphery of the radar device, the input signal level received by the radar device is not large (for example, not a burst signal).

In the fifth embodiment, a description is given with regard to a situation where, for example, a determination unit 410d detects a burst signal that is input from another radar device in the periphery of a radar device 100d.

The radar device 100d of the fifth embodiment is different from the radar device 100 of the first embodiment in terms of the configuration and operation of the determination unit and the operation of the gain adjustment unit. Therefore, in the present embodiment, when describing the configuration and operation of the radar device 100d and the radar device 100, descriptions of the same content are simplified or omitted and differences are described. For example, the configuration and operation of the determination unit 410d are described with respect to the differences with the configuration and operation of the determination unit 410, and the operation of a gain adjustment unit 420d is described with respect to the differences with the operation of the gain adjustment unit 420.

(Determination Unit of the Fifth Embodiment)

Figure 14:
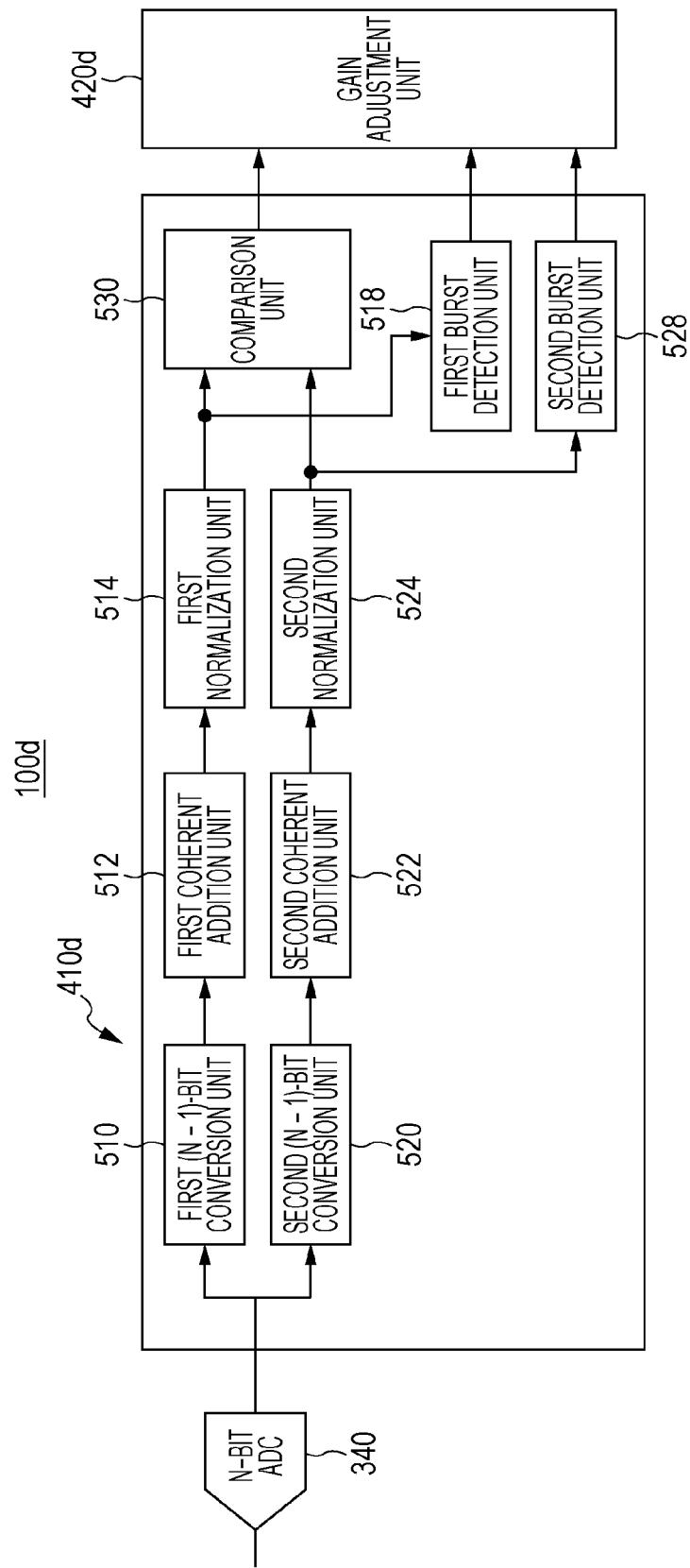
FIG. 14 is a block diagram depicting the internal configuration of a determination unit of a radar device of a fifth embodiment.

FIG. 14 is a block diagram depicting the internal configuration of the determination unit 410d of the radar device 100d of the fifth embodiment. The determination unit 410d depicted in FIG. 14 has the first (N-1)-bit conversion unit 510, the second (N-1)-bit conversion unit 520, the first coherent addition unit 512, the second coherent addition unit 522, the first normalization unit 514, the second normalization unit 524, the comparison unit 530, a first burst detection unit 518, and a second burst detection unit 528.

The first burst detection unit 518 acquires an addition result obtained after normalization by the first normalization unit 514, or in other words, a value obtained after the coherent addition result for the number of times C that coherent addition is performed in the first coherent addition unit 512 has been normalized. The first burst detection unit 518 determines whether or not a burst signal has been input to the radar device 100d, on the basis of the addition result obtained after normalization by the first normalization unit 514, or in other words, the value obtained after the coherent addition result for the number of times C that coherent addition is performed in the first coherent addition unit 512 has been normalized.

It should be noted that, in order to simplify the description of the first burst detection unit 518, a description is given hereafter with regard to a state in which a thermal noise signal has been input and a burst signal has not been input to the radar device 100d. Furthermore, the central level of the thermal noise signal is 100.

The thermal noise conforms with Gaussian distribution, and therefore the average value of the thermal noise signal is in the vicinity of 100. In a case where the radar device 100d receives a burst signal, the central level of the thermal noise signal temporarily fluctuates to a great extent and becomes, for example, 150.

In a case where a prescribed burst signal detection threshold value is set as 30, the first burst detection unit 518 determines whether or not the normalized coherent addition result for the number of times C that coherent addition is performed is included in the range of 70 (=100−30) to 130 (=100+30), centered on 100. For example, in a case where 150 is detected as a large value level, the first burst detection unit 518 detects the input of a burst signal.

The second burst detection unit 528 acquires an addition result obtained after normalization by the second normalization unit 524, or in other words, a value obtained after the coherent addition result for the number of times C that coherent addition is performed in the second coherent addition unit 522 has been normalized. The second burst detection unit 528 determines whether or not a burst signal has been input to the radar device 100d, on the basis of the addition result obtained after normalization by the second normalization unit 524, or in other words, the value obtained after the coherent addition result for the number of times C that coherent addition is performed in the second coherent addition unit 522 has been normalized. An example of the determination made in the second burst detection unit 528 is the same as that for the first burst detection unit 518, and therefore a description thereof is omitted.

In a case where the input of a burst signal is detected as the determination result of the determination unit 410d, the gain adjustment unit 420d nullifies a determination result regarding the suitability of a gain value used for the dithering of a thermal noise signal in the period in which the burst signal is detected, and uses a determination result regarding the suitability of a gain value used for the dithering of the thermal noise signal in a period in which a burst signal is not detected to readjust the gain value.

As described above, the radar device 100d of the present embodiment detects a burst signal from another radar device in the periphery of the radar device 100d, on the basis of an addition result obtained after normalization by the first normalization unit 514 and an addition result obtained after normalization by the second normalization unit 524, in the first burst detection unit 518 and the second burst detection unit 528 of the determination unit 410d.

Thus, the radar device 100d obtains the same effect as that of the radar device 100 of the first embodiment, and, in addition, nullifies a determination result of the determination unit 410d in the period in which a burst signal is detected, and uses a determination result of the determination unit 410d in a period in which a burst signal is not detected to readjust the gain value, and is therefore able to set a gain value that is suitable for the VGA 330, even when a burst signal is detected.

It should be noted that, in the detection of a burst signal, the number of times that coherent addition is performed by the first coherent addition unit 512 input to the first normalization unit 514, and the number of times that coherent addition is performed by the second coherent addition unit 522 input to the second normalization unit 524 may be values that are the same as the number of times that coherent addition is performed in the coherent addition unit 360 of the radar device 100d or may be less than the number of times that coherent addition is performed.

Sixth Embodiment

A radar device 100e of the sixth embodiment is different from the radar device 100b of the third embodiment in terms of the configuration and operation of the determination unit and the operation of the gain adjustment unit. Therefore, in the present embodiment, when describing the configuration and operation of the radar device 100e and the radar device 100b, descriptions of the same content are simplified or omitted and differences are described. For example, the configuration and operation of a determination unit 410e are described with respect to the differences with the configuration and operation of the determination unit 410b, and the operation of a gain adjustment unit 420e is described with respect to the differences with the operation of the gain adjustment unit 420b.

(Determination Unit of the Sixth Embodiment)

FIG. 15 is a block diagram depicting the internal configuration of the determination unit 410e of the radar device 100e of the sixth embodiment. The determination unit 410e depicted in FIG. 15 includes the configuration of the determination unit 410b of the third embodiment, or in other words, k number of N-bit counters, normalization units, and threshold value determination units.

Specifically, the determination unit 410e has an N-bit counter 5501, an (N−1)-bit counter 5502, an (N−2)-bit counter 5503, . . . , an (N−k+1)-bit counter 550k, k number of normalization units 514e1, 514e2, 514e3, . . . 514ek, and k number of threshold value determination units 530e1, 530e2, 530e3, . . . 530ek.

The N-bit counter 5501 counts the number of times that there is "+1" or "0" for the $N^{th}$ bit from the most significant bit, namely the least significant bit, with respect to input quantization data.

The (N−1)-bit counter 5502 counts the number of times that there is "+1" or "0" for the $(N-1)^{th}$ bit from the most significant bit, namely the second least significant bit, with respect to the input quantization data.

The (N−2)-bit counter 5503 counts the number of times that there is "+1" or "0" for the $(N-2)^{th}$ bit from the most significant bit, namely the third least significant bit, with respect to the input quantization data.

Likewise, the (N−k+1)-bit counter 550k counts the number of times that there is "+1" or "0" for the $(N-k+1)^{th}$ bit from the most significant bit, namely the $(k-1)^{th}$ least significant bit, with respect to the input quantization data.

By counting the number of times that there is "+1" or "0" for the $N^{th}$ bit from the most significant bit, the N-bit counter 5501 determines whether or not (N+1)-bit quantization resolution is possible with respect to the ADC 340 that has N-bit quantization resolution. That is, the N-bit counter 5501, the normalization unit 514e1, and the threshold value determination unit 530e1 determine the suitability of a gain value used for the dithering of a thermal noise signal, in a state in which a gain value that is 6 dB higher than a gain value set by the gain adjustment unit 420e is set in the VGA 330.

By counting the number of times that there is "+1" or "0" for the $(N-1)^{th}$ bit from the most significant bit, the (N-1)-bit counter 5502 determines whether or not N-bit quantization resolution is possible with respect to the ADC 340 that has N-bit quantization resolution. That is, the (N-1)-bit counter 5502, the normalization unit 514e2, and the threshold value determination unit 530e2 determine suitability as a gain value used for the dithering of a thermal noise signal, in a state in which a gain value that is 12 dB higher than the gain value set by the gain adjustment unit 420e is set in the VGA 330.

By counting the number of times that there is "+1" or "0" for the $(N-2)^{th}$ bit from the most significant bit, the (N-2)-bit counter 5503 determines whether or not (N-1)-bit quantization resolution is possible with respect to the ADC 340 that has N-bit quantization resolution. That is, the (N-2)-bit counter 5503, the normalization unit 514e3, and the threshold value determination unit 530e3 determine suitability as a gain value used for the dithering of a thermal noise signal, in a state in which a gain value that is 18 dB higher than the gain value set by the gain adjustment unit 420e is set in the VGA 330.

Likewise, by counting the number of times that there is "+1" or "0" for the $(N-k+1)^{th}$ bit from the most significant bit, the (N-k+1)-bit counter 550k determines whether or not (N-k+2)-bit quantization resolution is possible with respect to the ADC 340 that has N-bit quantization resolution. That is, the (N-k+1)-bit counter 550k, the normalization unit 514ek, and the threshold value determination unit 530ek determine the suitability of a gain value used for the dithering of a thermal noise signal, in a state in which a gain value that is 6×k dB higher than the gain value set by the gain adjustment unit 420e is set in the VGA 330.

As a determination result of the determination unit 410e, in a case where any of the threshold value determination units (for example, the threshold value determination unit 530ek) from among the threshold value determination units 530e1 to 530ek corresponding to the N-bit counter 5501 to the (N-k 1)-bit counter 550k has determined that the gain value is suitable for the dithering of a thermal noise signal, the gain adjustment unit 420e sets the gain value set in the VGA 330 to 6×k dB.

As described above, the radar device 100e of the present embodiment sets a gain value that is set in the VGA 330, in accordance with a threshold value determination unit that has determined that the gain value is suitable for the dithering of a thermal noise signal, by using a count result regarding the number of times that there is "+1" or "0" for the $N^{th}$ to the $(N-k+1)^{th}$ bits from the most significant bit of input quantization data, in the determination unit 410e that includes k number of N-bit counters, normalization units, and threshold value determination units.

Thus, the radar device 100e obtains the same effect as that of the radar device 100 of the first embodiment, and, in addition, can reduce the number of times that attempts are made to obtain the gain value set in the VGA 330 (for example, the number of times that the processing of step S13 to step S15 depicted in FIG. 9 is carried out) compared to the radar device 100 of the first embodiment.

More specifically, in the radar device 100 of the first embodiment, in a case where the difference between an addition result obtained after normalization by the first normalization unit 514 and an addition result obtained after normalization by the second normalization unit 524 is less than a threshold value in the comparison unit 530 in step S13, the gain value is unsuitable for the dithering of the thermal noise signal, and therefore a search is repeated for a gain value until a prescribed gain value is added to the gain value set in the VGA 330 such that a gain value that is suitable for the dithering of a thermal noise signal is set.

It should be noted that, in the radar device 100e of the present embodiment, the determination unit 410e searches for a gain value a total of k times in one go, and can therefore reduce the number of times that attempts are made to search for the gain value set in the VGA 330, to 1/k.

Seventh Embodiment

A radar device 100f of the seventh embodiment is different from the radar device 100 of the first embodiment in terms of the configuration and operation of the determination unit and the operation of the gain adjustment unit. Therefore, in the present embodiment, when describing the configuration and operation of the radar device 100f and the radar device 100, descriptions of the same content are simplified or omitted and differences are described. For example, the configuration and operation of a determination unit 410f are described with respect to the differences with the configuration and operation of the determination unit 410, and the operation of a gain adjustment unit 420f is described with respect to the differences with the operation of the gain adjustment unit 420.

FIG. 16 is a block diagram depicting the internal configuration of the determination unit 410f of the radar device 100f of the seventh embodiment. The determination unit 410f depicted in FIG. 16 has a saturation detection unit 560, the first (N-1)-bit conversion unit 510, the second (N-1)-bit conversion unit 520, the first coherent addition unit 512, the second coherent addition unit 522, the first normalization unit 514, the second normalization unit 524, and the comparison unit 530. Quantization data of the ADC 340 that has N-bit quantization resolution is input to the first (N-1)-bit conversion unit 510 and the second (N-1)-bit conversion unit 520 via the saturation detection unit 560.

FIG. 17 is an illustrative drawing depicting an example of quantization data obtained after bit conversion by the first (N-1)-bit conversion unit 510 and the second (N-1)-bit conversion unit 520 with respect to the input of a thermal noise signal and a burst signal to the quantization resolution N-bit ADC 340, and a result regarding the suitability of a gain value used for dithering. FIG. 17 depicts a state in which a thermal noise signal and a burst signal have been input to the radar device 100f, and the burst signal is not saturated.

The quantization data obtained after bit conversion by the first (N-1)-bit conversion unit 510 and the second (N-1)-bit conversion unit 520 depicted in FIG. 17 becomes a value Vb obtained by a burst signal component (Vb-Vc) being added to a center voltage Vc, or in other words, the center voltage in a state in which a thermal noise signal is being input to the radar device 100f. It should be noted that, in FIG. 17, the power value increases as the bit value decreases.

To rephrase, the addition result obtained after normalization by the first normalization unit 514 becomes (100+98+100+100+100)/5=498/5=99.6 (to Vb), and the addition result obtained after normalization by the second normalization unit 524 becomes (99+99+101+99+101)/5=499/5=99.8 (to Vb).

Accordingly, in the comparison unit 530, the difference between the addition result obtained after normalization by the first normalization unit 514 and the addition result obtained after normalization by the second normalization unit 524 is obtained, and therefore, even though a burst signal that is not saturated has been detected, in a case where it is determined that the absolute value (=0.2) of the difference between the addition result obtained after normalization by the first normalization unit 514 and the addition result obtained after normalization by the second normalization unit 524 is less than a prescribed threshold value (=0.5), it is determined that the gain value is suitable for the dithering of the thermal noise signal that has been input to the radar device 100f, and the determination result is output to the gain adjustment unit 420. In other words, the comparison unit 530 determines that a gain value for quantizing the thermal noise signal in accordance with (N+1)-bit quantization resolution is set in the VGA 330.

However, in a case where a burst signal that has been input to the radar device 100f is saturated, the accuracy of the determination result in the determination unit 410f deteriorates due to the effect of the saturated burst signal. FIG. 18 depicts quantization data obtained after bit conversion by the first (N−1)-bit conversion unit 510 and the second (N−1)-bit conversion unit 520 in which a burst signal is saturated. Vb is saturated, and therefore the power value obtained after bit conversion is converted to any of 0, 1, or 2 as the largest value. FIG. 18 is an illustrative drawing depicting an example of quantization data obtained after bit conversion by the first (N−1)-bit conversion unit and the second (N−1)-bit conversion unit with respect to the input of a saturated burst signal to the resolution N-bit ADC, and a result regarding the suitability of a gain value used for dithering.

In the first (N−1)-bit conversion unit 510, the entirety of the detected burst signal becomes 1, and in the second (N−1)-bit conversion unit 520, the detected burst signal becomes 0 or 2. The absolute value of the difference is 0.8, and therefore the comparison unit 530 determines that the gain value is unsuitable for dithering because it is greater than the prescribed threshold value 0.5.

Therefore, the radar device 100f detects whether or not an external signal (for example, a burst signal) that has been input as well as a thermal noise signal is saturated, and stops the determination processing in the determination unit 410f in a case where the input external signal is saturated.

The saturation detection unit 560 detects whether or not the input quantization data is saturated, or in other words, whether or not the input quantization data exceeds the dynamic range of the ADC 340. In a case where the saturation detection unit 560 has detected saturation of the input quantization data, the detection result is notified to the control unit CNT. In accordance with the notification from the saturation detection unit 560, the control unit CNT stops the determination processing for a gain value used for the dithering of a thermal noise signal performed by the determination unit 410f, until the saturation of the quantization data input to the determination unit 410f is no longer detected.

It should be noted that, in a case where the saturation detection unit 560 has detected saturation of input quantization data, a saturation flag indicating the detection result may be temporarily stored in a memory (not depicted). While the transmission of the radar transmission signal LTX is stopped, the control unit CNT continuously or periodically confirms whether or not a saturation flag has been stored in the memory. In a case where it is detected that a saturation flag has been stored in the memory, the control unit CNT stops the determination processing for a gain value used for the dithering of a thermal noise signal performed by the determination unit 410f, until the saturation of the quantization data input to the determination unit 410f is no longer detected.

As described above, while the transmission of the radar transmission signal LTX is stopped, the radar device 100f of the present embodiment detects whether or not quantization data (for example, a burst signal component) that has been input as well as a thermal noise signal is saturated, or in other words, whether or not the input quantization data exceeds the dynamic range of the ADC 340. The radar device 100f detects whether or not an external signal (for example, a burst signal) that has been input as well as a thermal noise signal is saturated, and stops the determination processing in the determination unit 410f in a case where the input external signal is saturated.

Thus, the radar device 100f obtains the effect of the radar device 100 of the first embodiment, and, in addition, controls the execution or stopping of the determination processing in the determination unit 410f in accordance with whether or not an external signal (for example, a burst signal) transmitted from another radar device is saturated. In other words, the radar device 100f adjusts the gain value set in the VGA 330 in accordance with a result regarding the suitability of the gain value used for the dithering of the input thermal noise signal while the transmission of the radar transmission signal LTX is stopped, without being affected by an external signal transmitted from another radar device.

Heretofore, various embodiments have been described with reference to the drawings; however, it goes without saying that the present disclosure is not restricted to these examples. It is obvious that a person skilled in the art could conceive of various altered examples or modified examples within the categories described in the claims, and naturally it is to be understood that these also belong to the technical scope of the present disclosure.

Furthermore, in the aforementioned embodiments, cases where the present disclosure is configured by using hardware have been taken as examples and described; however, it is also possible for the present disclosure to be realized by using software in cooperation with hardware.

The present disclosure is useful as a radar device that adjusts gain for quantizing a signal with high resolution by dithering regardless of whether or not there are temperature fluctuations.

What is claimed is:

1. A radar device comprising:
   a transmitter that transmits a high-frequency radar transmission signal from a transmission antenna;
   a controller that controls execution or stopping of transmission of the radar transmission signal;
   a receiver that amplifies a thermal noise signal inputted from reception antenna by using a prescribed gain value and quantizes the amplified thermal noise signal, while the transmission of the radar transmission signal is stopped; and
   a gain controller that adjusts the prescribed gain value to a gain value suitable for dithering of the thermal noise signal, based on the quantized thermal noise signal.

2. The radar device according to claim 1, wherein the gain controller includes:
   a determinator that determines suitability of a gain value used for the dithering of the thermal noise signal, based on the quantized thermal noise signal; and a gain adjuster that adjusts the prescribed gain value to the gain value suitable for the dithering of the thermal noise signal, in accordance with the determination result.

3. The radar device according to claim 2, wherein the determinator includes:
a least significant bit counter that (1) counts, within a prescribed number of samples of the quantized thermal noise signal, at least one of (i) a number of samples of the quantized thermal noise signal having 1 as a least significant bit and (ii) a number of samples of the quantized thermal noise signal having 0 as a least significant bit, and that (2) outputs a difference between (i) the number of samples of the quantized thermal noise signal having 1 as a least significant bit and (ii) the number of samples of the quantized thermal noise signal having 0 as a least significant bit;
a normalizer that normalizes the difference by the prescribed number of samples; and
a threshold value determinator that determines the suitability of the gain value used for the dithering of the thermal noise signal, in accordance with a comparison result between the normalized difference and a threshold value, and
the gain adjuster adds a prescribed gain value increase amount to the prescribed gain value in a case where the normalized difference exceeds the threshold value.

4. The radar device according to claim 2, wherein the determinator includes:
k number of k-bit counters that output a $k^{th}$ (k: N−k+1 to N, k and N being integers of 2 or more, and k<N) difference between a number of a $k^{th}$ bit of the quantized thermal noise signal is 1 and a number of a $k^{th}$ bit of the quantized thermal noise signal is 0;
k number of normalizers that normalize the $k^{th}$ difference by a number of times that the $k^{th}$ bit is counted; and
k number of threshold value determinators that determine the suitability of the gain value used for the dithering of the thermal noise signal, in accordance with a comparison result between the $k^{th}$ normalized difference and a second threshold value, and
the gain adjuster that adds a prescribed gain value increase amount to the prescribed gain value in a case where at least one of the $k^{th}$ normalized difference exceeds the second threshold value.

5. The radar device according to claim 2, wherein the determinator includes:
a first bit converter that obtains a first quantization data by converting the quantized thermal noise signal into a value that is the same as the quantized thermal noise signal or an even number value that is less by 1;
a second bit converter that obtains a second quantization data by converts the quantized thermal noise signal into a value that is the same as the quantized thermal noise signal or an odd number value that is less by 1;
a first coherent adder that obtains a first addition result by performing coherent addition for a prescribed number of times on the first quantization data;
a second coherent adder that obtains a second addition result by performing coherent addition for the prescribed number of times on the second quantization data;
a first normalizer that normalizes the first addition result by the prescribed number of times;
a second normalizer that normalizes the second addition result by the prescribed number of times; and
a comparator that obtains a second difference between the first normalized addition result and the second normalized addition result, and determines the suitability of the gain value used for the dithering of the thermal noise signal, in accordance with a comparison result between the second difference and a third threshold value, and
the gain adjuster that adds a prescribed gain value increase amount to the prescribed gain value in a case where the second difference exceeds the third threshold value.

6. The radar device according to claim 2, wherein the determinator includes:
a first bit converter that obtains a first quantization data by converting the quantized thermal noise signal into a value that is the same as the quantized thermal noise signal or an even number value that is less by 1;
a second bit converter that obtains a second quantization data by converting the quantized thermal noise signal into a value that is the same as the quantized thermal noise signal or an odd number value that is less by 1;
a subtractor that calculates a difference between the first quantization data and the second quantization data;
a coherent adder that obtains an addition result by performing coherent addition for a prescribed number of times on the difference;
a normalizer that normalizes the addition result by the prescribed number of times; and
a comparator that determines the suitability of the gain value used for the dithering of the thermal noise signal, in accordance with a comparison result between the addition result and a threshold value, and
the gain adjuster adds a prescribed gain value increase amount to the prescribed gain value in a case where the addition result exceeds the threshold value.

7. The radar device according to claim 5, wherein the determinator additionally includes:
a first stability determinator that compares the addition first result and a prescribed stability determination threshold value; and
a second stability determinator that compares the second addition result and the prescribed stability determination threshold value, and
the gain adjuster adjusts the gain value increase amount added to the prescribed gain value to a lower value, in a case where at least either of the first normalized addition result and the second normalized addition result exceeds the prescribed stability determination threshold value.

8. The radar device according to claim 5, wherein the determinator additionally includes:
a first burst signal detector that compares the first addition result and a prescribed burst signal detection threshold value; and
a second burst signal detector that compares the second addition result and the prescribed burst signal detection threshold value, and
the gain adjuster that nullifies the determination result in the comparator in a case where at least either of the first normalized addition result and the second normalized addition result exceeds the prescribed burst signal detection threshold value.

9. The radar device according to claim 5, wherein the determinator additionally includes a saturation detector that compares the quantized thermal noise signal within a dynamic range of the receiver, and the controller that stops process of the comparator in a case where the quantized thermal noise signal is saturated.

10. The radar device according to claim 1, wherein
the radar device is a multi-sector radar, and
the receiver additionally includes:
a correlation calculator that calculates a correlation between the radar transmission signal and a reflected wave signal obtained by the radar transmission signal being reflected by an object, at each transmission cycle of the radar transmission signal; and
a coherent adder that adds correlation calculation results in the correlation calculator, for the transmission cycles of a prescribed number of times.

\* \* \* \* \*